US006831719B2

(12) United States Patent
Jang et al.

(10) Patent No.: US 6,831,719 B2
(45) Date of Patent: Dec. 14, 2004

(54) TRANSMISSIVE AND REFLECTIVE TYPE LIQUID CRYSTAL DISPLAY

(75) Inventors: Yong-Kyu Jang, Suwon-si (KR); Hyung-Guel Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 39 days.

(21) Appl. No.: 10/183,143

(22) Filed: Jun. 26, 2002

(65) Prior Publication Data

US 2003/0112388 A1 Jun. 19, 2003

(30) Foreign Application Priority Data

Dec. 18, 2001 (KR) ........................................ 2001-80714

(51) Int. Cl.$^7$ .......................................... G02F 1/1335
(52) U.S. Cl. ...................................................... 349/114
(58) Field of Search ................................. 349/113–115

(56) References Cited

U.S. PATENT DOCUMENTS

| | | | |
|---|---|---|---|
| 5,889,570 A | * | 3/1999 | Mitsui et al. ................ 349/113 |
| 6,023,309 A | | 2/2000 | Gogna et al. |
| 6,115,095 A | * | 9/2000 | Suzuki et al. ................ 349/141 |
| 6,262,782 B1 | | 7/2001 | Yamazaki et al. |
| 6,262,842 B1 | * | 7/2001 | Ouderkirk et al. .......... 359/487 |
| 6,344,887 B1 | * | 2/2002 | Ma et al. ....................... 349/98 |
| 6,456,346 B1 | * | 9/2002 | Arai ............................ 349/106 |
| 6,621,543 B2 | * | 9/2003 | Moon .......................... 349/115 |

OTHER PUBLICATIONS

PCT International Search Report dated Jun. 30, 2003.
Song et al., U.S. patent appln. Publication No. 2001/0019385 A1, entitled "Transflective Liquid Crystal Display Device" published Sep. 6, 2001.

* cited by examiner

Primary Examiner—Robert H. Kim
Assistant Examiner—Richard H Kim
(74) Attorney, Agent, or Firm—F. Chau & Associates LLC

(57) ABSTRACT

Disclosed is a transmissive and reflective type LCD. In the LCD, a second substrate faces a first substrate. A liquid crystal layer is formed between the first substrate and the second substrate. A first polarizing plate is formed on an outer surface of the first substrate. A second polarizing plate is formed on an outer surface of the second substrate. A backlight is arranged for irradiating incident light onto the polarizing plate. A transparent transflective film is arranged between the first polarizing plate and the backlight for partially reflecting and partially transmitting the incident light. The transparent transflective film includes at least a first layer and a second layer, the first and second layers having different refractivity indexes from each other and are alternatively stacked. By a restoring process occurring between the transflective film and the backlight, a predetermined amount of the incident light is transmitted through the transflective film repeatedly, so that transmissivity and light efficiency are enhanced.

32 Claims, 17 Drawing Sheets

OFF

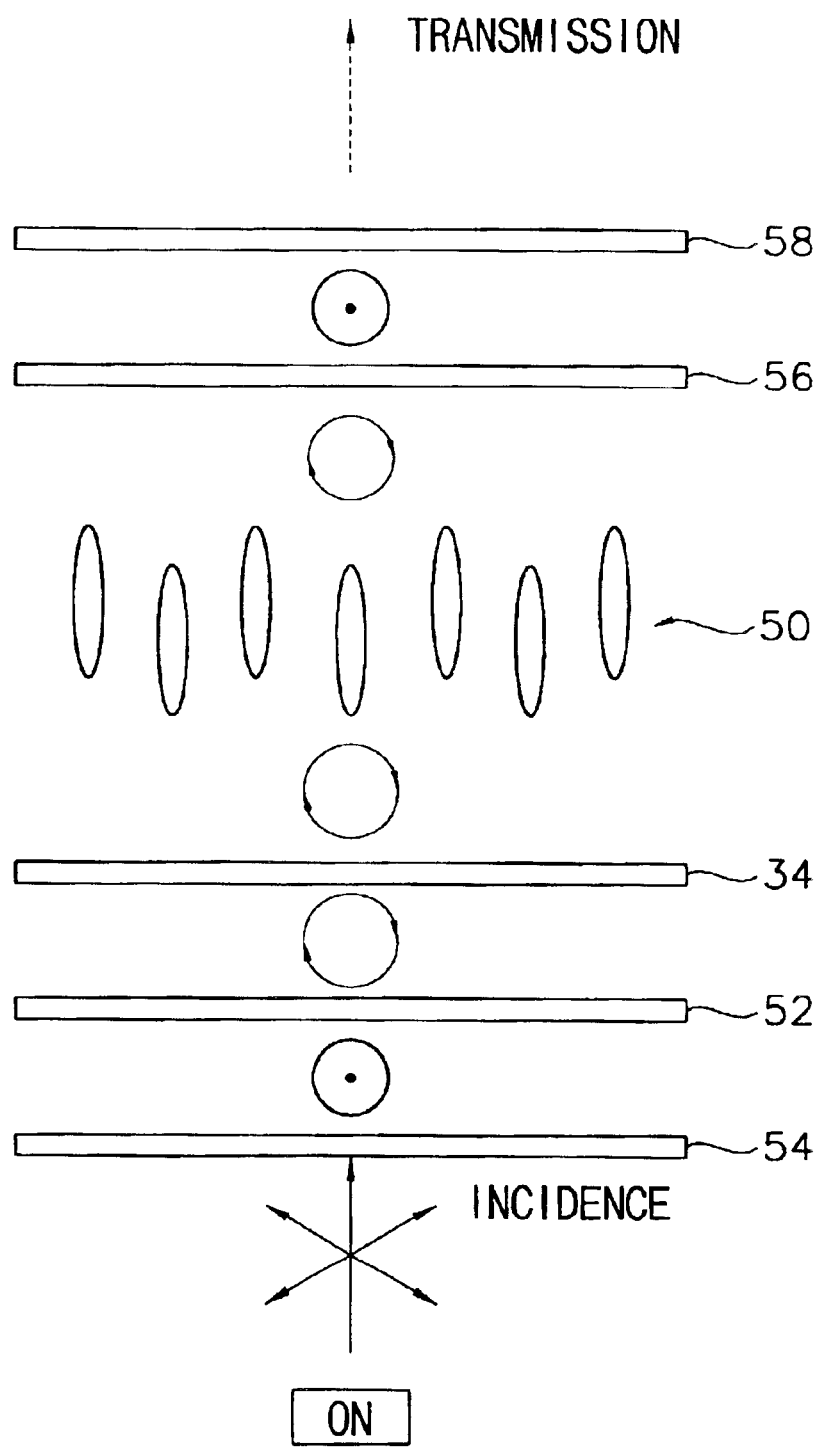

TRANSMISSIVE AND REFLECTIVE TYPE LIQUID CRYSTAL DISPLAY

BACKGROUND OF THE INVENTION

1. Field of the Invention

The present invention relates to a liquid crystal display, and more particularly, to a transmissive and reflective type liquid crystal display in which the display operation is carried out in reflection mode and transmission mode.

2. Description of the Related Art

Liquid crystal displays (LCDs) have become displays of choice among the various developed flat panel type displays because they are much slimmer and lighter than other types of displays. They also require lower driving voltage and lower power consumption.

LCD displays are classified as transmission type which display images using an external light source such as a backlight, as reflection type which display an image using natural light, and transmissive and reflective type which display in a transmission mode using an internal light source provided in the display itself at indoors or a dark place where an external light source does not exist and the display operates in a reflection mode to display images by reflecting external incident light in a high brightness environment such as at outdoors.

LCDs can also be classified depending on the way they are driven. For example, In the passive matrix type, pixels in the LCDs are driven using a root-mean-square (rms) of a difference between voltages applied to signal lines and scanning lines, while a line addressing in which a signal voltage is applied to all of the pixels at the same time is carried out. In the active matrix type, pixels are driven by a switching element such as a MIM (Metal-insulator-metal) device or a thin film transistor.

FIG. 1 is a sectional view of a conventional transmissive and reflective type LCD, and shows an active matrix type LCD using the thin film transistor.

Referring to FIG. 1, the conventional transmissive and reflective type LCD includes a first substrate 10, a second substrate 40 arranged facing the first substrate 10, a liquid crystal layer 50 formed between the first substrate 10 and the second substrate 40, and a light source, i.e., a backlight assembly 60 disposed at a rear side of the first substrate 10.

The first substrate 10 includes a first insulating substrate 11, a thin film transistor 25 formed on the first insulating substrate 11, a passivation film 30 having a contact hole 32 for exposing a part of the thin film transistor 25, a transparent electrode 34, and a reflection electrode 36. The thin film transistor 25 includes a gate electrode 12, a gate insulating film 14, an active pattern 16, an ohmic contact pattern 18, a source electrode 20, and a drain electrode 22. The transparent electrode 34 functions as a pixel electrode for transmitting light that is generated from the backlight 60 and is then incident through the first substrate 10. The transparent electrode 34 is connected to the thin film transistor 25 formed on every unit pixel region on the first substrate 10. The reflection electrode 36 reflects external light that is incident through the second substrate 40 and at the same time functions as another pixel electrode. The transparent electrodes 34 include regions of a transmission part T and a reflection part R for reflecting the external light incident through the second substrate 40.

The second substrate 40 includes a second insulating substrate 42, a color filter 44 comprised of RGB pixels for displaying colors while light is transmitted therethrough, a black matrix 46 for preventing the light from being leaked between the pixels, and a transparent common electrode 48.

The liquid crystal layer 50 is made of 90° twisted nematic (TN) liquid crystal, and has an approximately 0.24 of $\Delta$nd which is a product of anisotropy $\Delta$n in refractive index and thickness d of the liquid crystal layer 50.

Also, according to an alignment direction of the liquid crystal molecules, a first polarizing plate 54 and a second polarizing plate 58 are respectively attached to external surfaces of the first and second substrates 10 and 40 so as to transmit only polarized light in a specific direction. The first and second polarizing plates 54 and 58 are all linear polarizers in which each polarizing axis of the first and second polarizing plates 54 and 58 is orthogonal to each other.

Between the first substrate 10 and the first polarizing plate 54, and between the second substrate 40 and the second polarizing plate 58, there are respectively arranged a first ¼ wavelength phase difference plate 52 and a second ¼ wavelength phase difference plate 56. Each of the ¼ wavelength phase difference plates 52 and 56 functions to convert linearly polarized light to circularly polarized light; or vice versa by causing a phase difference of ¼ wavelength between two polarization components that are orthogonal to each other and are parallel to the optical axes of the ¼ wavelength phase difference plates 52 and 56.

Hereinafter, there are respectively described operations in the reflection mode and the transmission mode in the conventional transmissive and reflective type LCD shown in FIG. 1.

FIGS. 2A and 2B are schematic views for illustrating an operation of the conventional LCD in the reflection mode.

First, when a pixel voltage is not applied (OFF), as shown in FIG. 2A, light that is incident from an outside is transmitted through the second polarizing plate 58, so that the light is linearly polarized in a direction parallel to the polarizing axis of the second polarizing plate 58. The linearly polarized light is transmitted through the second ¼ wavelength phase difference plate 56, so that the linearly polarized light is converted onto left-handed circularly polarized light. The left-handed circularly polarized light is transmitted through the liquid crystal layer 50, so that the left-handed circularly polarized light is linearly polarized in a direction vertical to the polarizing axis of the second polarizing plate 58, and is then incident onto the reflection electrode 36. The linearly polarized light, which is reflected by the reflection electrode 36, is transmitted through the liquid crystal layer 50, so that the linearly polarized light is converted onto the left-handed circularly polarized light. The left-handed circularly polarized light is transmitted through the second ¼ wavelength phase difference plate 56, so that the left-handed circularly polarized light is linearly polarized in a direction parallel to the polarizing axis of the second polarizing plate 58. And then, the linearly polarized light is transmitted through the second polarizing plate 58, so that a white image is displayed.

When a maximum pixel voltage is applied (ON), as shown in FIG. 2B, light that is incident externally is transmitted through the second polarizing plate 58, so that it is linearly polarized in a direction parallel to the polarizing axis of the second polarizing plate 58. The linearly polarized light is transmitted through the second ¼ wavelength phase difference plate 56, so that it is converted onto left-handed circularly polarized light. The left-handed circularly polarized light is transmitted through the liquid crystal layer 50 without variation in the polarization state, and is then incident onto the reflection electrode 36. The light, which is incident onto the reflection electrode 36, is reflected by the reflection electrode 36, so that it is converted to right-handed circularly polarized light and the converted right-handed circularly polarized light is transmitted through the liquid crystal layer 50. Thus, the right-handed circularly polarized light, which has been passed through the liquid crystal layer 50, is transmitted through the second ¼ wavelength phase difference plate 56, so that it is linearly polarized in a direction perpendicular to the polarizing axis of the second polarizing plate 58. The linearly polarized light is shielded by the second polarizing plate 58, so that a black image is displayed.

FIGS. 3A and 3B are schematic views for illustrating an operation mechanism of the transmission mode.

When a pixel voltage is not applied (OFF), as shown in FIG. 3A, light that is irradiated from a backlight disposed below the first polarizing plate 54 is incident onto the first polarizing plate 54, and only light propagating in a direction parallel to the polarizing axis of the first polarizing plate 54 is transmitted through the first polarizing plate 54. At this time, since the polarizing axis of the first polarizing plate 54 is perpendicular to that of the second polarizing plate 58, the light that has been passed through the first polarizing plate 54 is converted onto light linearly polarized in a direction perpendicular to the polarizing axis of the second polarizing plate 58. The linearly polarized light is converted onto a right-handed circularly polarized light by a first ¼-wavelength phase difference plate 52. The right-handed circularly polarized light is transmitted through a transparent electrode 34, and is then incident to a liquid crystal layer 50. The right-handed circularly polarized light is transmitted through the liquid crystal layer 50, so that it is linearly polarized in a direction parallel to the polarizing axis of the second polarizing plate 58. The linearly polarized light is transmitted through a second ¼-wavelength phase difference plate 56, so that it is converted onto the right-handed circularly polarized light. At this time, since only a light component propagating in a direction parallel to the polarizing axis of the second polarizing plate 58 can be transmitted through the second polarizing plate 58, only about 50% of the right-handed circularly polarized light is transmitted through the second polarizing plate 58. Accordingly, there is a light loss of about 50%, and an image having a moderate brightness is displayed.

Meanwhile, although not shown in the drawings, an optical path of the incident light becomes different at a region where a metal layer, such as the gate line, the data line, or the reflection electrode exists in the transmission mode. In other words, light that is incident from the backlight is transmitted through the first polarizing plate 54, so that it is linearly polarized in a direction parallel to the polarizing axis of the first polarizing plate 54. The linearly polarized light is transmitted through the first ¼ wavelength phase difference plate 52, so that it is right-handed circularly polarized. The right-handed circularly polarized light is reflected by metal layers, and become left-handed circularly polarized. Then, the left-handed circularly polarized light is transmitted through the first ¼ wavelength phase difference plate 52, so that it is linearly polarized in a direction parallel to the polarizing axis of the first polarizing plate 54. Accordingly, the linearly polarized light is absorbed in the first polarizing plate 54, and does not return to the backlight. Thus, the light reflected by the metal layers is not reproduced and disappears, so that an overall light efficiency is lowered.

When a maximum pixel voltage is applied (ON), as shown in FIG. 3B, light that is irradiated from a backlight disposed below the first polarizing plate 54 is incident onto the first polarizing plate 54, so that only light propagating in a direction parallel to the polarizing axis of the first polarizing plate 54 is transmitted through the first polarizing plate 54. The light linearly polarized by the first polarizing plate 54 is converted into a right-handed circularly polarized light after being transmitted through the first ¼ wavelength phase difference plate 52. The right-handed circularly polarized light is transmitted through the transparent electrode 34, and is then incident onto the liquid crystal layer 50. The right-handed circularly polarized light is transmitted through the liquid crystal layer 50 without variation in the polarization state, and is linearly polarized in a direction orthogonal to the polarizing axis of the second polarizing plate 58 after being transmitted through the second ¼ wavelength phase difference plate 56. Afterwards, the light linearly polarized in the direction orthogonal to the polarizing axis of the second polarizing plate 58 is not transmitted to the second polarizing plate 58, so that a dark image is displayed.

As described above, since the conventional transmissive and reflective type LCD has to be provided with the wide band ¼ wavelength phase difference plates 52 and 56 covering an overall frequency band of the visible ray, as well as the first and second polarizing plates 54 and 58 with respect to each of the first and second substrates 10 and 40, manufacturing cost is increased as compared with the transmission type LCD. Also, since the polarization characteristic in the transmission mode causes light loss of about 50%, there are drawbacks in that a light transmissivity decreases by about 50% and contrast ratio (C/R) is lowered.

Further, since $\Delta nd$ of the liquid crystal layer 50 is only about 0.24 $\mu$m which is a half of $\Delta nd$ (about 0.48 $\mu$m) of the conventional transmission type LCD, the cell gap of the liquid crystal cell should be decreased to a level of about 3 $\mu$m, and the refractive anisotropy $\Delta n$ of the liquid crystal also should be decreased. Accordingly, there is a need for a transmissive and reflective type LCD device and method which avoids aforementioned problems.

SUMMARY OF THE INVENTION

Accordingly, the present invention is to solve the aforementioned problems of the conventional art, and it is an object of the present invention to provide a transmissive and reflective type LCD capable of simplifying a structure of a liquid crystal cell and decreasing light loss in the transmission mode.

In one aspect, there is provided a transmissive and reflective type LCD comprising a first substrate, a second substrate, a liquid crystal layer, a first polarizing plate, a second polarizing plate, a backlight, and a transparent transflective film. In the transmissive and reflective type LCD, the second substrate has an inner surface that is arranged facing the first substrate, and the liquid crystal layer is formed between the first substrate and the second substrate. The first polarizing plate is formed on an outer surface of the first substrate. The second polarizing plate is formed on an outer surface of the second substrate, the outer surface being opposite to the inner surface of the second substrate. The backlight is arranged for irradiating incident light onto the first polarizing plate. The transparent transflective film is arranged between the first polarizing plate and the backlight for partially reflecting and partially transmitting the incident light. The transparent transflective film includes at least a first layer and a second layer having different refractivity indexes from each other and are alternatively stacked.

According to another aspect of the invention, there is provided a transmissive and reflective type LCD for partially reflecting and transmitting incident light, comprising an LC cell, a first polarizing plate, a second polarizing plate, a backlight and a transparent transflective film. The LC cell includes a first substrate, a second substrate having an inner surface that is arranged to face the first substrate, and a liquid crystal layer formed between the first substrate and the second substrate. The first polarizing plate is formed on an outer surface of the first substrate. The second polarizing plate is formed on an outer surface of the second substrate that oppositely faces the inner surface of the second substrate. The backlight is arranged at a rear side of the first polarizing plate. The transparent transflective film is arranged between the first polarizing plate and the backlight, and has a plurality of layers in which a first layer and a second layer having different refractivity indexes from each other. The transmissive and reflective type LCD has a reflection light path along which the incident light is incident onto the LC cell from a front side of the LC cell, is reflected by the transflective film, and is output through the front side of the LC cell. And, the transmissive and reflective type LCD has a transmission light path along which the incident light is incident onto the LC cell from a rear side of the LC cell, is transmitted through the transflective film, and is output through the front side of the LC cell.

The transmissive and reflective type LCD of the invention does not require a reflection electrode within LC cell or a ¼-wavelength phase difference plate on each of the upper substrate (second substrate) and the lower substrate (first substrate). Hence, compared with the conventional transmissive and reflective type LCD, the transmissive and reflective type LCD of the present invention is simpler and more easily made.

Further, it is possible that the transflective film of partially being transmitted and reflecting incident light performs both functions of the reflection electrode and the transparent electrode at the same time, and a recycling process of light is lastingly generated, so that light loss is not generated in the transmission mode. Accordingly, compared with the conventional transmissive and reflective type LCD, the transmissive and reflective type LCD of the invention has an enhanced transmissivity. Also, since the transmissive and reflective type LCD of the invention does not utilize the ¼ wavelength phase difference plate, the light that is incident from the backlight and is then reflected by metal regions of LC cell is recycled and again used, so that it becomes possible to enhance an overall light efficiency.

Furthermore, since the optical conditions applied to the liquid crystal of the conventional transmissive and reflective type LCD can be identically applied to that of the transmissive and reflective type LCD of the present invention, there is no degradation in reliability.

BRIEF DESCRIPTION OF THE DRAWINGS

The above objects and other advantages of the present invention will become more apparent by describing in detail exemplary embodiments thereof with reference to the attached drawings in which:

FIGS. 3A and 3B are schematic views for illustrating a transmissive and reflective type LCD of FIG. 1 in a transmission mode;

DETAILED DESCRIPTION OF PREFERRED EMBODIMENTS

Now, exemplary embodiments of the present invention will be described in detail with reference to the annexed drawings.

Figure 4:
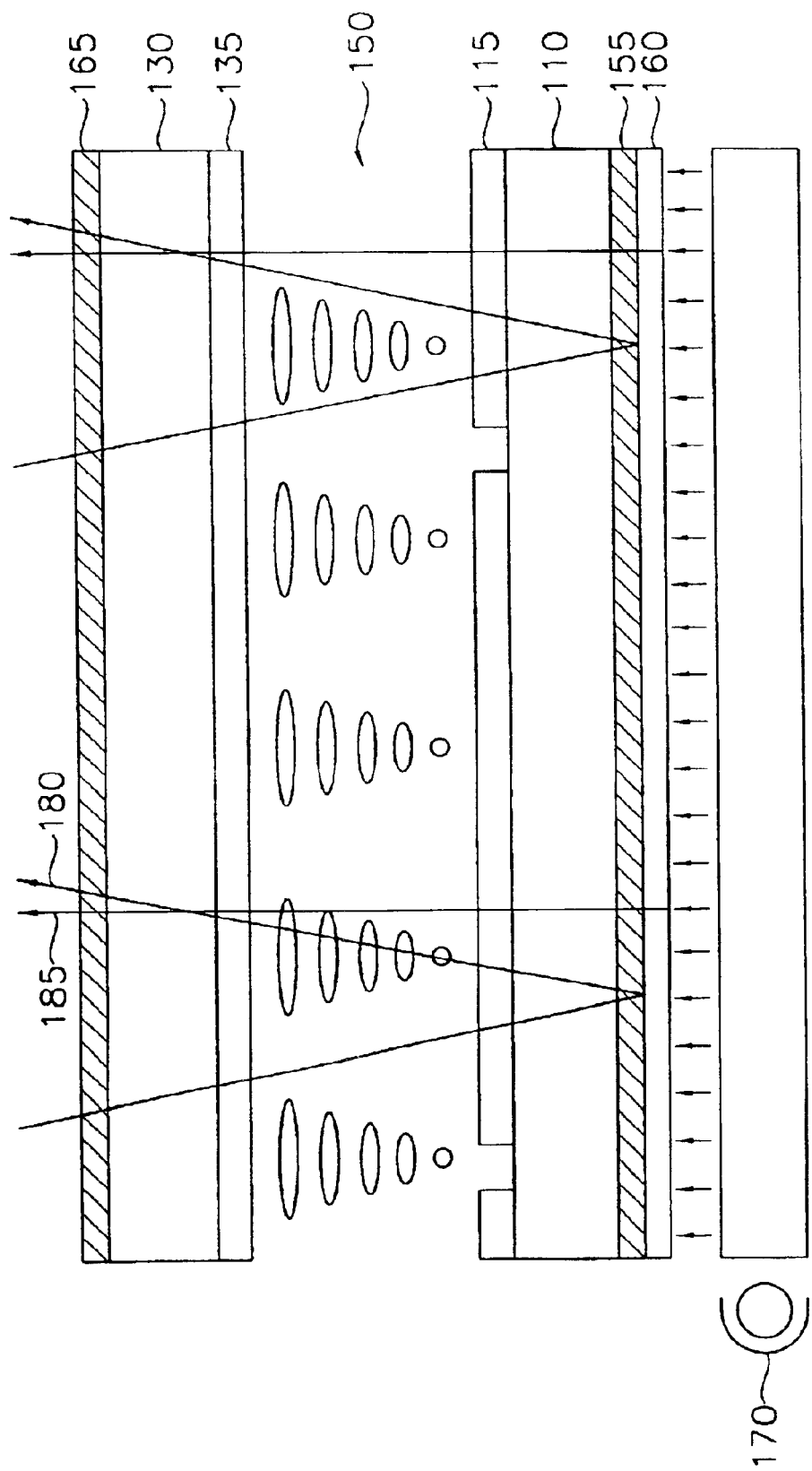
FIG. 4 is a sectional view of a transmissive and reflective type LCD in accordance with an embodiment of the present invention.

FIG. 4 is a sectional view of a transmissive and reflective type LCD in accordance with an embodiment of the present invention.

Referring to FIG. 4, the transmissive and reflective type LCD includes a first substrate 110, a second substrate 130 of which an inner surface is arranged facing the first substrate 110, and a liquid crystal layer 150 formed between the first substrate 110 and the second substrate 130.

The first and second substrates 110 and 130 are preferably manufactured using a glass substrate.

A first transparent electrode 115 is formed on the inner surface of the first substrate 110. Preferably, the first transparent electrode 115 is formed of conductive oxide film such as indium tin oxide (ITO). Preferably, the first transparent electrode 115 is elongated in a first direction, and serves as a signal electrode that is repeatedly arranged in a second direction orthogonal to the first direction.

A first polarizing plate 155 is disposed on the outer surface of the first substrate 110. A second polarizing plate 165 is formed on an outer surface of the second substrate 130, opposite the inner surface of the second substrate 130. The first and second polarizing plates 155 and 165 function to absorb polarized light and to transmit other polarized light, thereby allowing incident light to be transmitted in a specific direction. The first and second polarizing plates 155 and 165 are linear polarizers of which polarizing axes are arranged to be orthogonal to each other.

A backlight 170 is installed at a rear side of the first polarizing plate 155.

A second transparent electrode 135 made of conductive oxide film such as ITO is formed on the inner surface of the second substrate 130 facing the first substrate 110. Preferably, the second transparent electrode 135 serves as a scanning electrode that is repeatedly arranged in a second direction and is elongated in the first direction. In other words, in a passive matrix type LCD, the first transparent electrode 115 of the first substrate 110 and the second transparent electrode 135 of the second substrate 130 are arranged to be orthogonal to each other such that they are used as the signal electrode and scanning electrode, respectively.

The liquid crystal layer 150 is made of 270° super twisted nematic (STN) liquid crystal. Alternatively, the liquid crystal layer 150 can be made of 90° twisted nematic (TN) liquid crystal. One skilled in the art readily appreciates that the passive matrix type LCD uses STN liquid crystal while the active matrix type LCD uses TN liquid crystal.

According to an embodiment of the present embodiment, the liquid crystal layer 150 has an Δnd of about 0.2 μm to about 0.6 μm that is a product of a refractive anisotropy Δn and a thickness d of the liquid crystal layer 150, preferably about 0.48 μm. The value of about 0.48 μm allows the LCD of the present invention to identically use an LC optical condition of the conventional transmission type LCD without modification, thereby preventing the reliability of the liquid crystal from being lowered.

Figure 5:
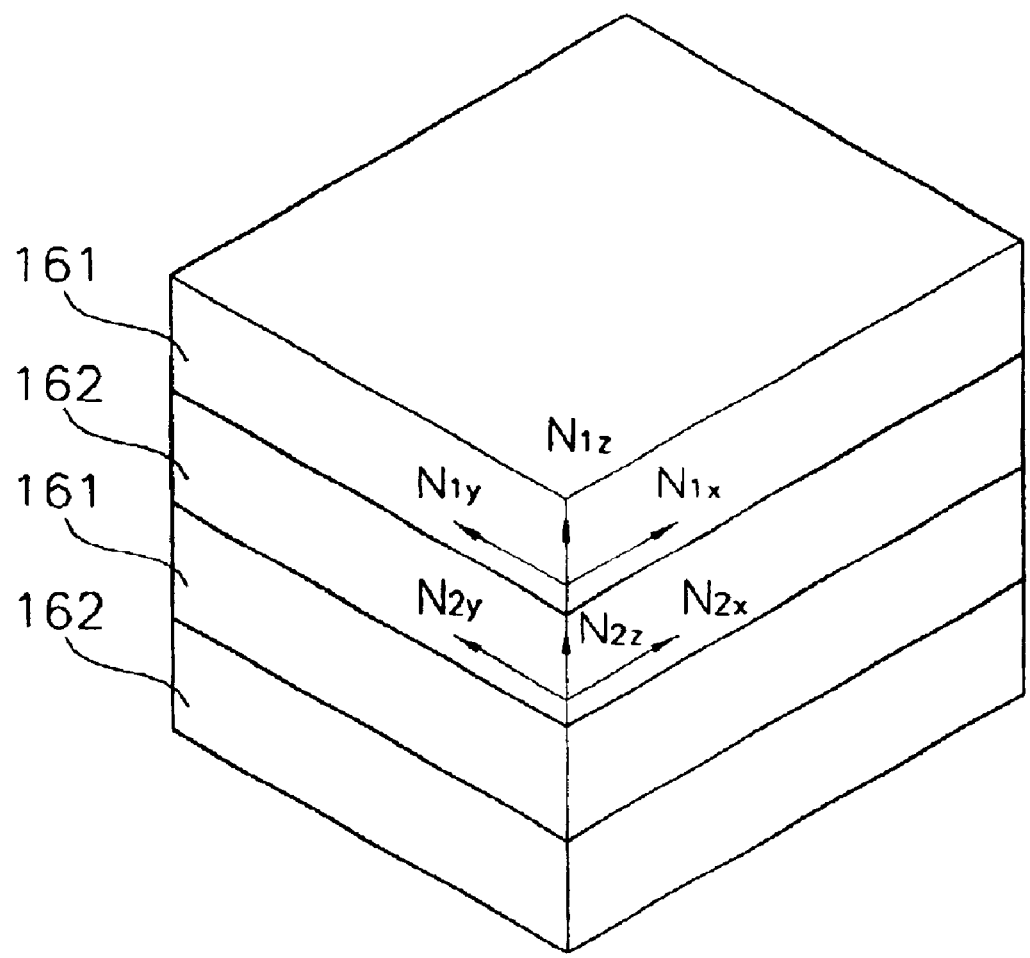
FIG. 5 is a schematic view showing a structure of the transflective film shown in FIG. 4.

A transflective film 160 is disposed between the first polarizing plate 155 and the backlight 170. The transflective film 160 includes at least two transparent layers having a different refractivity index from each other. A first layer 161 and a second layer 162 are preferably alternatively stacked as shown in FIG. 5. The transparent transflective film 160 functions to partially reflect and transmit incident light. Accordingly, the transmissive and reflective type LCD in accordance with an embodiment of the invention has a reflection light path 180 and a transmission light path 185. In the reflection light path, incident light is incident toward the second substrate 130, is transmitted through the first substrate 110, is reflected by the transflective film 160, and is output through the second substrate 130. In the transmission light path 185, incident light is incident from the backlight onto the transflective film 160 and the first substrate 110, and is output through the second substrate 130.

Hereinafter, the structure and operations of the transflective film 160 are described.

Referring to FIG. 5, when it is assumed that the transflective film 160 has a film thickness direction of z-axis and a film plane of x-y plane, the transflective film 160 according to an aspect of the present invention is characterized in that the first layer 161 thereof has a refractive anisotropy within the film plane, e.g., x-y plane, and the second layer 162 does not have a refractive anisotropy within the film plane.

The transflective film 160 has various transmissivity and reflectivity characteristics depending on polarizing state and direction of the incident light. For instance, when it is assumed that a direction parallel to an elongated direction of the transflective film 160 is x-direction and a direction perpendicular to the elongated direction is y-direction, each of the first layer 161 having a high refractivity and refractive anisotropy within the film plane and the second layer 162 not having refractive anisotropy have three main refractive indexes of $n_x$, $n_y$, and $n_z$ that satisfy the following relationships (1):

$$n1_x = n1_z \neq n1_y;$$

$$n2_x = n2_y = n2_z;$$

$$n1_x \neq n2_x;$$

$$n1_y \neq n2_y;$$

and $$|n1_x - n2_x| < |n1_y - n2_y| \quad (1).$$

(n1x, n1y, and n1z denotes a main refractive index of the first layer in an x-axis, a y-axis, and a z-axis, respectively, and n2x, n2y, and n2z denotes a main refractive index of the second layer in an x-axis, a y-axis, and a z-axis, respectively)

Thus, if a refractivity difference in the x-direction between the first layer 161 and the second layer 162 is less than a refractivity difference in the y-direction between the first layer 161 and the second layer 162, when a non-polarized light is incident in the direction perpendicular to the film plane, i.e., z-direction, a polarization component polarized parallel to the y-direction is mostly reflected due to a high difference in the refractivity based on Fresnel's equation, but a polarization component polarized parallel to the x-direction is partially transmitted and reflected due to a low difference in the refractivity.

There are disclosed methods for enhancing the display brightness by using a reflection type polarizing plate made of dielectric multilayered film having birefringence in Japanese Patent Laid Open Publication No. 9-506985 and International Patent Publication No. WO 97/01788. The dielectric multilayered film having birefringence has a structure in which two kinds of polymer layers are alternatively stacked. One of the two kinds of polymer layers is selected from a polymer group having a high refractivity and the other is selected from a polymer group having a low refractivity.

Hereinafter, the structure of the dielectric multilayered film is reviewed in an aspect of optical property.

For instance, when it is assumed that there is the following relationship between the first layer in which a material having a high refractivity is elongated, and a second layer in which a material having a low refractivity is elongated:

$$n1_x = n1_z = 1.57, n1_y = 1.86;$$

and $$n2_x n_y = n2_z = 1.57.$$

Thus, in case that refractivities of the first and second layers in the x-direction and the z-direction are identical and refractivities of the first and second layers in the y-direction are different from each other, when non-polarized light is incident in the direction perpendicular to the film plane, i.e., z-direction, polarization components in the x-direction are all transmitted, polarization components in the y-direction are all reflected based on Fresnel's equation. A representative example of birefringence dielectric multilayered films having the above characteristics is DBEF (Dual brightness enhancement film). The DBEF has a multilayered structure in which two kinds of films made of different material are a few hundred layers stacked. In other words, poly(ethylene naphtalate) layer having a high birefringence and poly(methyl methacrylate) (PMMA) layer are alternatively stacked to form the DBEF layer. Since naphthalene groups of the poly(ethylene naphtalate) layer has a flat plane structure, when those groups are adjacently placed to each other, it is easy to stack the poly(ethylene naphtalate) layer and the DBEF layer, so that the refractivity in the stacking direction becomes considerably different from those in other directions. On the contrary, since the PMMA is an amorphous polymer and is isotropically aligned, the PMMA has an identical refractivity in all directions.

The DBEF transmits all x-directional polarization components and reflects all y-directional polarization components, while the transflective film 160 according to an aspect of the present invention mostly reflects a specific-directional (for instance, y-directional) polarization component, but partially reflects and transmits polarization component, which is polarized in a direction (for instance, x-direction) orthogonal to the specific direction. The transflective film can be made by vertically attaching two anisotropic transflective films having various transmissivity and reflectivity depending on polarizing state and direction of an incident light. Alternatively, the transflective film can be made by attaching an anisotropic transflective film having various transmissivity and reflectivity depending on polarizing state and direction of incident light and a transflective film having isotropic reflection and transmission characteristics regardless of polarizing state and direction of incident light. The two transflective films can be made in an integrally formed structure, or made in a separately formed film structure.

Also, according to another preferred aspect of the invention, the transflective film 160 has isotropic reflection and transmission characteristics regardless of polarizing state and direction of incident light. For instance, if it is assumed that a direction parallel to an elongated direction of the film is in the x-direction and a direction perpendicular to the elongated direction of the film is in the y-direction, the first layer 161 having a high refractivity and the second layer 162 having a low refractivity both have a refractive isotropy within x-y planes of the film, and each of the first and second layers 161 and 162 have three main refractive indexes of $n_x$, $n_y$, and $n_z$ that satisfy the following relationships:

$$n1_x = n1_y = n1_z;$$

and $$n2_x = n2_y = n2_z \neq n1_z \quad (2).$$

Thus, in case that the first and second layers 161 and 162 have different refractivity indexes in the z-direction, when non-polarized light is incident in the direction (i.e., z-direction) perpendicular to the film, polarization components in the x-direction are partially transmitted and reflected according to Fresnels's equation, and polarization components in the y-direction are partially transmitted and reflected. At this time, the reflectivity of reflected light can be adjusted to match with characteristics of the transmissive and reflective type LCD by controlling the thickness or the refractivity of the first layer 161 or the second layer 162. In other words, a reflection characteristic-enhanced transmissive and reflective type LCD enhances the reflectivity, whereas a transmissive and reflective type LCD in which transmission characteristic is considered to be an important issue, lowers the reflectivity to thereby enhance the transmissvity.

As described above, the transflective film 160 of the present invention can be formed to have an anisotropy characteristic in which transmissivity and reflectivity of the film 160 varies with polarizing state and direction of incident light, or can be formed to have an isotropy characteristic in which transmissivity and reflectivity of the film 160 do not depend on polarizing state and direction of the incident light. In any case, it is desirable that the transflective film 160 has a reflectivity of no less than about 4% with respect to polarization component in all directions when light is incident in a direction perpendicular to the film plane.

According to an embodiment of the present invention, the transflective film 160 can be made in an integrally formed structure together with the first polarizing plate 155, or made in a separately formed film structure separated from the first polarizing plate 155. In case that the transflective film 160 is made in an integrally formed structure together with the first polarizing plate 155, it is possible to decrease the thickness of the LC cell, and the LCD has an advantage in an aspect of manufacturing cost.

In the above, there is explained a method of forming the transflective film 160 by depositing or coating a multilayered polymer film on a surface of the first polarizing plate 155. This method differs from an anti-reflection treatment in the polarizing plate. In other words, in the anti-reflection treatment, two kinds of transparent films having different refractivity are repeatedly deposited or coated in a constant thickness such that destructive interference occurs by multi-reflection within the multilayered polymer film. However, to form a transflective film capable of partially transmitting and partially reflecting incident light, the film thickness should be adjusted such that constructive interference occurs.

Figure 6A:
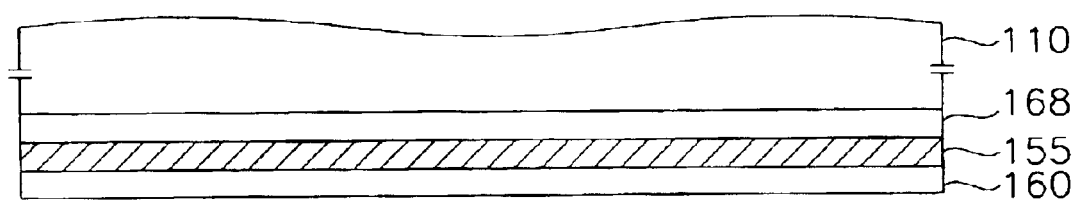
FIGS. 6A and 6B are sectional views for illustrating a light scattering layer that is applicable to the transmissive and reflective type LCD of FIG. 4.
Figure 6B:
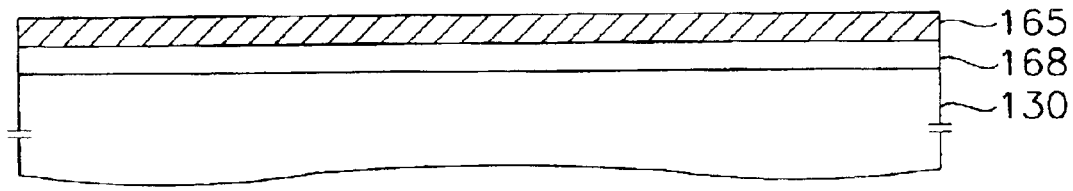

FIGS. 6A and 6B are sectional views for illustrating a light scattering layer that is applicable to the transmissive and reflective type LCD of FIG. 4;

Referring to FIGS. 6A and 6B, the transmissive and reflective type LCD further includes a light scattering layer 168 formed on the first substrate 110 or the second substrate 130 to prevent specular reflection and to properly diffuse a reflected light in various angles. For instance, it is possible to form the light scattering layer 168 between the first substrate 110 and the first polarizing plate 155, between the second substrate 130 and the second polarizing plate 165, or between the first polarizing plate 155 and the transflective film 160. The light scattering layer 168 can be made in an integrally formed structure together with the first polarizing plate 155 or the second polarizing plate 165, or made in a separate film structure separated from the polarizing plates 155 and 165. Further, the light scattering layer 168 can be made in a form of a plastic film in which transparent beads are dispersed. Moreover, the light scattering layer 168 can be made in a state in which beads are added to an adhesive, which makes it possible to directly attach the first substrate 110 to the first polarizing plate 155.

Furthermore, to optimize light efficiency in the transmissive and reflective type LCD, it is possible to form a phase difference plate (not shown) on the first substrate 110 or the second substrate 130. For instance, the phase difference plate is formed in an integrally formed structure together with polarizing plate or a separate film structure separated from the polarizing plate between the first substrate 110 and the first polarizing plate 155, or between the second substrate 130 and the second polarizing plate 165.

Hereinafter, there is described in detail an operation mechanism of the transmissive and reflective type LCD having the above structure.

FIG. 7A through FIG. 8B are schematic views for illustrating operations in reflection mode and transmission mode in the transmissive and reflective type LCD in which the transflective film 160 is made an integrally formed structure together with the first polarizing plate 155. Here, polarization directions of the light are represented on the basis of a polarizing axis of the second polarizing plate 165, and a partially reflected light and a partially transmitted light by a dotted line.

Figure 7A:
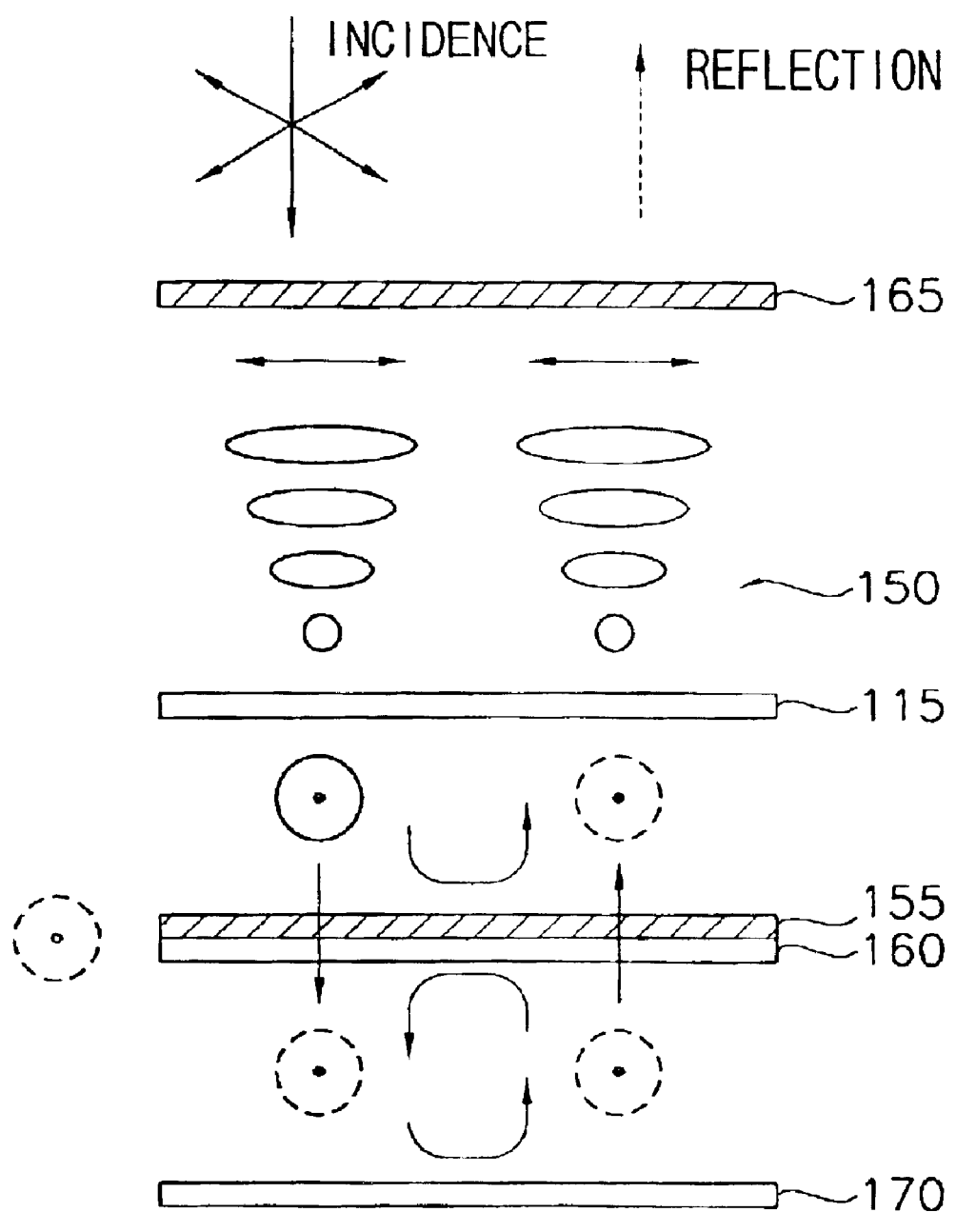
FIGS. 7A and 7B are schematic views for illustrating the transmissive and reflective type LCD of FIG. 4 applied in a reflection mode.

First, when a pixel voltage is not applied (OFF) in the reflection mode, as shown in FIG. 7A, light that is incident from an outside is transmitted through the second polarizing plate 165, so that the light is linearly polarized in a direction parallel to the polarizing axis of the second polarizing plate 165. The linearly polarized light is transmitted through the liquid crystal layer 150 and the first transparent electrode 115, so that the linearly polarized light is linearly polarized in a direction perpendicular to the polarizing axis of the second polarizing plate 165 and is then incident onto the transflective film 160 made an integrally formed structure together with the first polarizing plate 155. At this time, since the polarizing axis of the first polarizing plate 155 is orthogonal to that of the second polarizing plate 165, the light that is incident onto the first polarizing plate 155 is parallel to the polarizing axis of the first polarizing plate 155. Accordingly, the light linearly polarized in the direction parallel to the polarizing axis of the first polarizing plate 155 is partially transmitted through the transflective film 160 and is partially reflected by the transflective film 160. In other words, in case that the transflective film 160 has the refractivity characteristic of the relationship (1), a polarization component, which is polarized in the x-direction parallel to the elongated direction of the transflective film 160, in the lights that are incident onto the transflective film 160 is partially transmitted and reflected, whereas a polarization component which is polarized in the direction perpendicular to the elongated direction is mostly reflected. Further, in case that the transflective film 160 has the refractive characteristic of the relationship (2), in the lights that are incident onto the transflective film 160, the polarization components which is polarized in the x- and y-directions are partially transmitted and partially reflected.

Thus, the linearly polarized light reflected by the transflective film 160 is transmitted through the first transparent electrode 115 and the liquid crystal layer 150, so that it is linearly polarized in the direction parallel to the polarizing axis of the second polarizing plate 165. Afterwards, the light is transmitted through the second polarizing plate 165, so that a white image is displayed. Also, the lights that have been transmitted through the transflective film 160 are restored between the transflective film 160 and the backlight 170, and the restored lights repeatedly carry out a procedure of a partial reflection and a partial transmission. As a consequence, light loss is eliminated and reflectivity and light efficiency are enhanced.

Figure 7B:
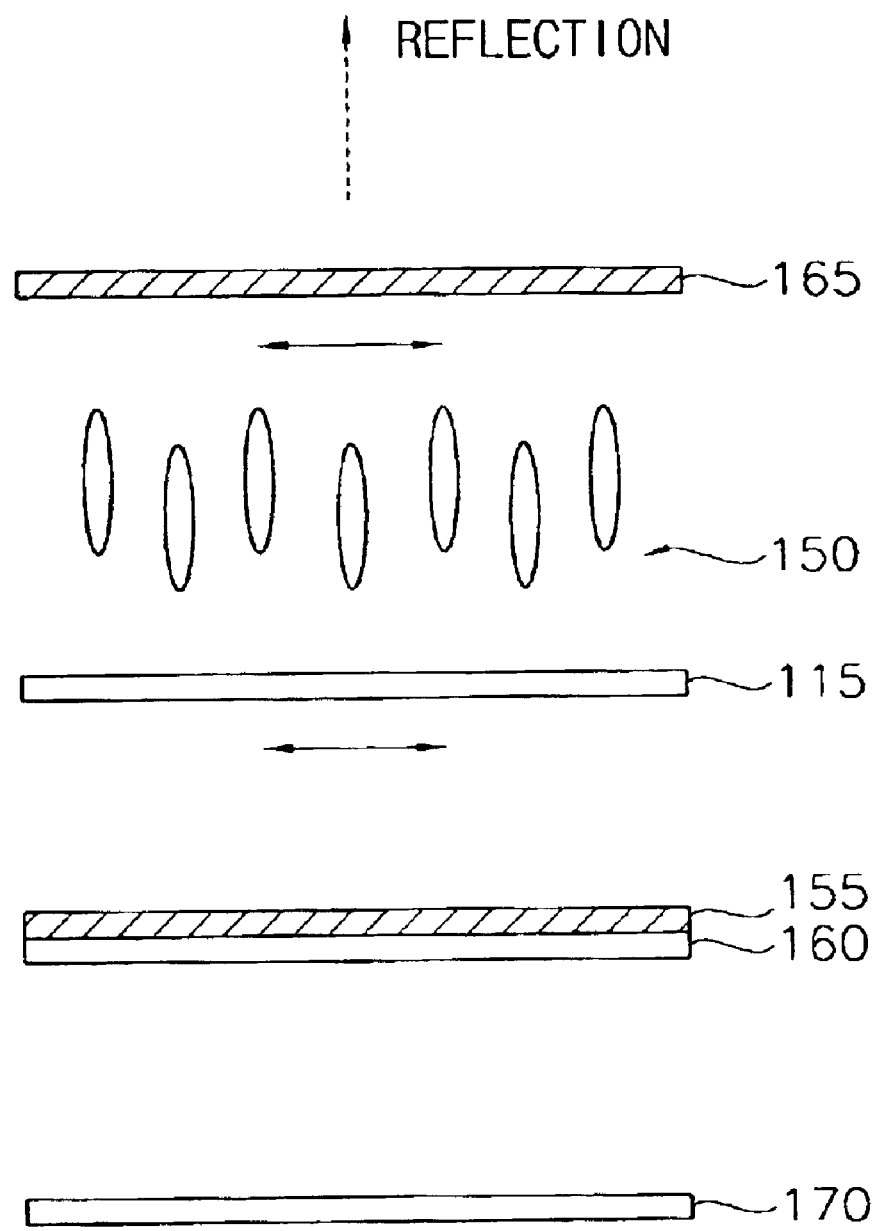

When a maximum pixel voltage is applied (ON) in the reflection mode, as shown in FIG. 7B, light that is incident from an outside is transmitted through the second polarizing plate 165, so that the light is linearly polarized in a direction parallel to the polarizing axis of the second polarizing plate 165. Afterwards, the linearly polarized light is transmitted through the liquid crystal layer 150 without a variation in the polarizing state, and is then incident onto the transflective film 160 integrally formed with the first polarizing plate 155. At this time, since the linearly polarized light is perpendicular to the polarizing axis of the first polarizing plate 155, the light is all absorbed in the first polarizing plate 155. Thus, the linearly polarized light is not reflected by the transflective film 160, so that a black image is displayed.

Figure 8A:
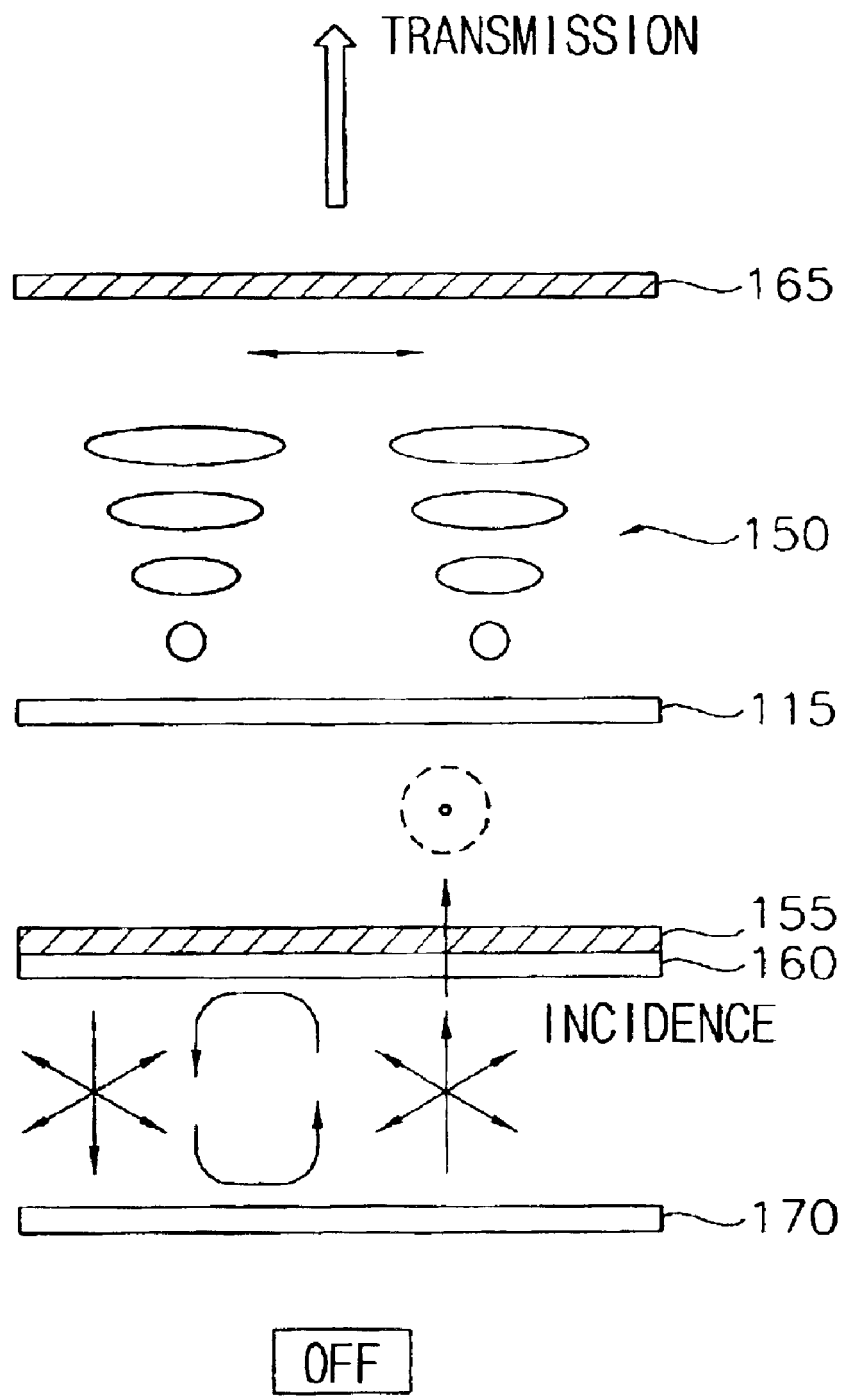
FIGS. 8A and 8B are schematic views for illustrating the transmissive and reflective type LCD of FIG. 4 applied in a transmission mode.

When a pixel voltage is not applied (OFF) in the transmission mode, as shown in FIG. 8A, light that is irradiated from the backlight 170 is incident onto the transflective film 160 integrally formed with the first polarizing plate 155. In case that the transflective film 160 has the refractive characteristic of the relationship (1), a polarization component, which is polarized parallel to the x-direction in the lights that are parallel to the polarizing axis of the first polarizing plate 155, is partially transmitted and reflected, whereas a polarization component which is polarized parallel to the y-direction is mostly reflected. Also, in case that the transflective film 160 has the refractive characteristic of the relationship (2), lights which are parallel to the polarizing axis of the first polarizing plate 155 are partially transmitted and partially reflected because all polarization components which are polarized in the x-direction and y-direction is partially transmitted and reflected.

Thus, the light that has been transmitted through the transflective film 160 and the first polarizing plate 155 becomes a linearly polarized light having a propagating direction parallel to the polarizing axis of the first polarizing plate 155. The linearly polarized light is transmitted through the first transparent electrode 115 and the liquid crystal 150, so that it is linearly polarized in a direction parallel to the polarizing axis of the second polarizing plate 165. Accordingly, the light linearly polarized in the direction parallel to the polarizing axis of the second polarizing plate 165 is transmitted through the second polarizing plate 165, so that a white image is displayed. Also, light reflected by the transflective film 160 is restored between the backlight 170 and the transflective film 160, and then repeats to carry out the above steps. Thus, polarization components parallel to the x-direction or polarization components parallel to the x- and y-directions are continuously transmitted through the transflective film 160 and are used, so that light loss is eliminated and transmissivity and light efficiency are enhanced.

Figure 8B:
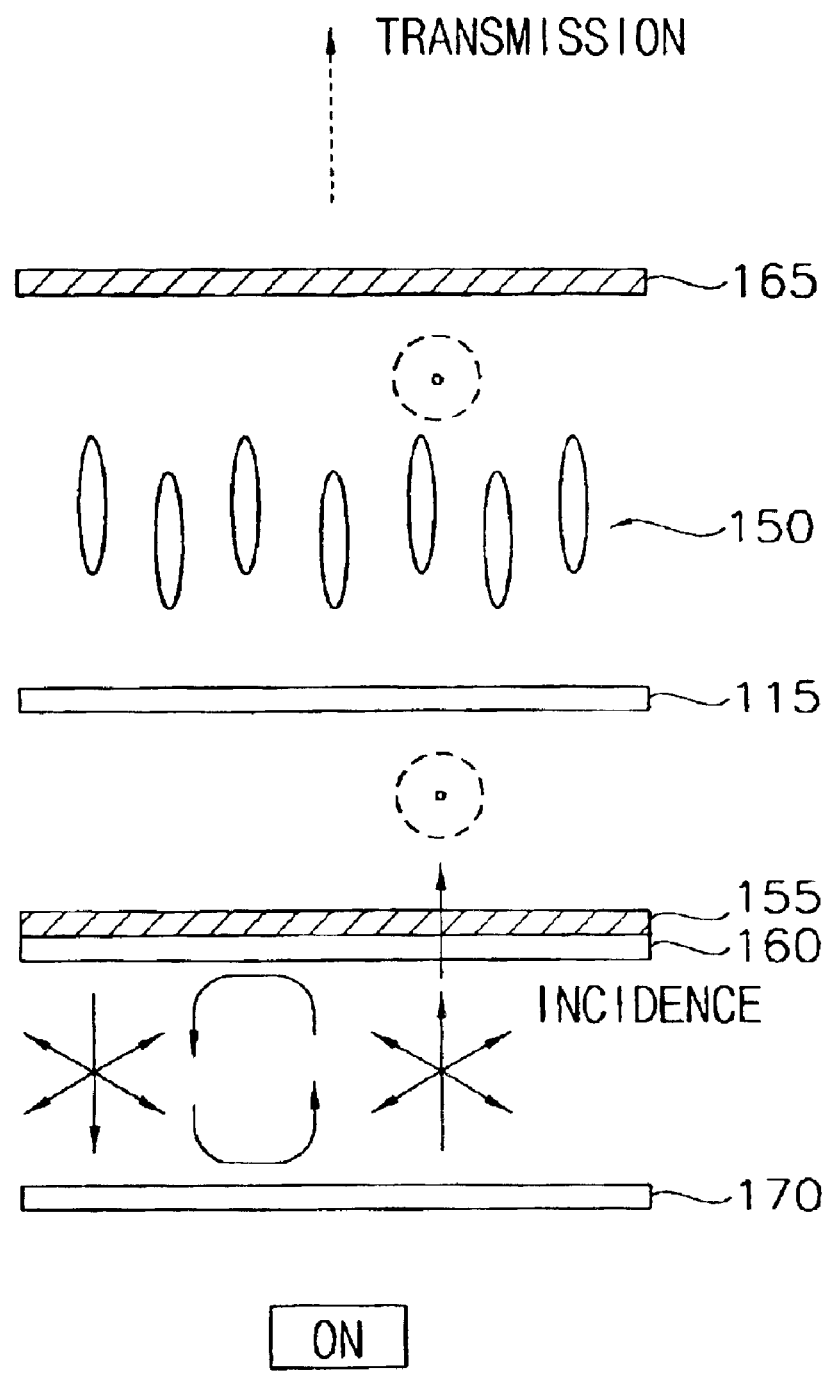

When a maximum pixel voltage is applied (ON) in the transmission mode, as shown in FIG. 8B, light that is irradiated from the backlight 170 is incident onto the transflective film 160 integrally formed with the first polarizing plate 155, so that the light parallel to the polarizing axis of the first polarizing plate 155 is partially transmitted and reflected. The light that has been transmitted through the transflective film 160 and the first polarizing plate 155, is converted onto light lineally polarized in the direction parallel to the polarizing axis of the first polarizing plate 155, i.e., in the direction perpendicular to the polarizing axis of the second polarizing plate 165. The linearly polarized light is transmitted through the first transparent electrode 115 and the liquid crystal layer 150 without a variation in the polarizing state. Accordingly, the light linearly polarized in the direction perpendicular to the polarizing axis of the second polarizing plate 165 is not transmitted through the second polarizing plate 165, so that a black image is displayed.

FIG. 9A through FIG. 10B are schematic views for illustrating the transmission mode and the reflection mode of a transmissive and reflective type LCD in which the transflective film 160 is separated from the first polarizing plate 155 and is made in a film structure. Here, polarization directions of the light are represented on the basis of a polarizing axis of the second polarizing plate 165, and partially reflected light and partially transmitted light by a dotted line.

Figure 9A:
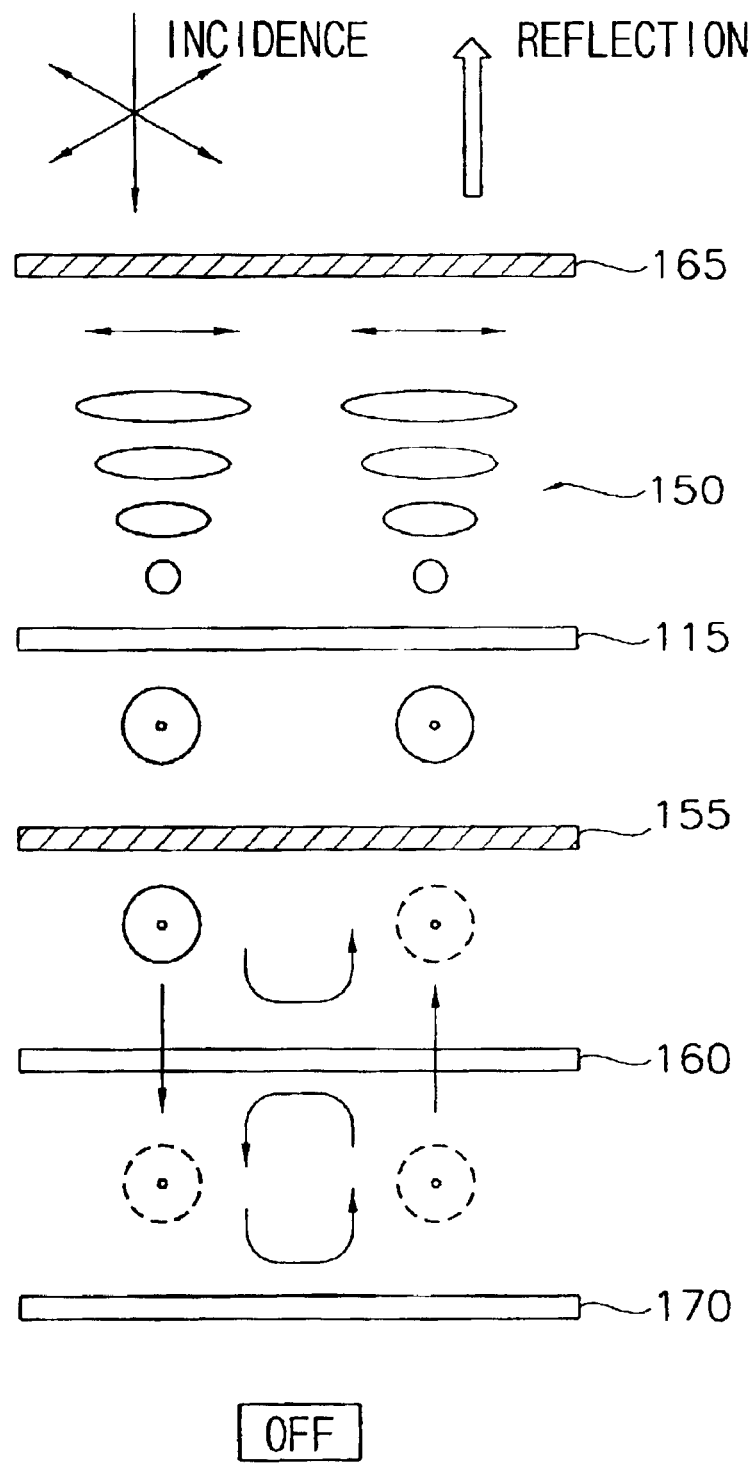
FIGS. 9A and 9B are schematic views for illustrating the transmissive and reflective type LCD of FIG. 4 applied in a reflection mode.

First, when a pixel voltage is not applied (OFF) in the reflection mode, as shown in FIG. 9A, light that is incident from an outside is transmitted through the second polarizing plate 165, so that the light is linearly polarized in a direction parallel to the polarizing axis of the second polarizing plate 165. The linearly polarized light is transmitted through the liquid crystal layer 150 and the first transparent electrode 115, so that the linearly polarized light is linearly polarized in a direction perpendicular to the polarizing axis of the second polarizing plate 165 and is then incident onto the first polarizing plate 155. At this time, since the polarizing axis of the first polarizing plate 155 is orthogonal to that of the second polarizing plate 165, the light that has been linearly polarized in a direction perpendicular to the polarizing axis of the second polarizing plate 155 is transmitted through the first polarizing plate 155 and is then incident onto the transflective film 160. In case that the transflective film 160 has the refractivity characteristic defined in equation (1), a polarization component, which is polarized in the x-direction parallel to the elongated direction of the transflective film 160, light rays directed incident to the transflective film 160 is partially transmitted and reflected, whereas a polarization component, which is polarized in the y-direction perpendicular to the elongated direction, is mostly reflected. Further, in case that the transflective film 160 has the refractive characteristic of the relationship (2), light rays that are incident to the transflective film 160, the polarization components polarized in the x- and y-directions are partially transmitted and partially reflected.

Thus, since the linearly polarized light reflected by the transflective film 160 is parallel to the polarizing axis of the first polarizing plate 155, it is transmitted through the first polarizing plate 155, and is incident onto the liquid crystal layer 150 via the transparent electrode 115. The linearly polarized light is transmitted through the liquid crystal layer 150, whereby it is linearly polarized in the direction parallel to the polarizing axis of the second polarizing plate 165. Afterwards, the light is transmitted through the second polarizing plate 165, so that a white image is displayed. Also, the light rays that have been transmitted through the transflective film 160 are restored between the transflective film 160 and the backlight 170, and the restored light repeatedly carry out a procedure of a partial reflection and a partial transmission. As a consequence, light loss is eliminated and reflectivity and light efficiency are enhanced.

Figure 9B:
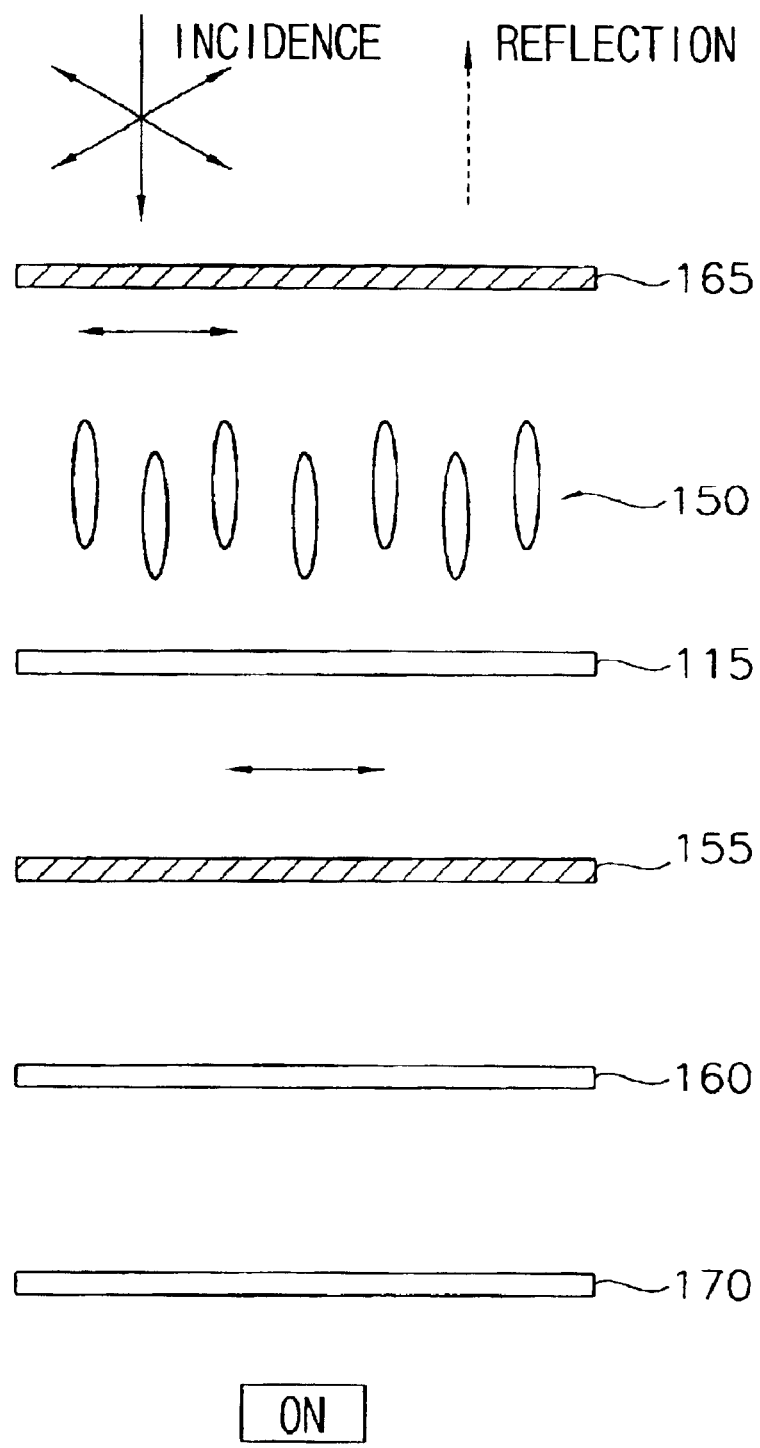

When a maximum pixel voltage is applied (ON) in the reflection mode as shown in FIG. 9B, light that is incident from an outside is transmitted through the second polarizing plate 165, so that the light is linearly polarized in a direction parallel to the polarizing axis of the second polarizing plate 165. Afterwards, the linearly polarized light is transmitted through the liquid crystal layer 150 without a variation in the polarizing state, and is then incident onto the first polarizing plate 155. At this time, since the linearly polarized light is perpendicular to the polarizing axis of the first polarizing plate 155, the light is all absorbed in the first polarizing plate 155. Thus, since the linearly polarized light is not reflected by the transflective film 160, a black image is displayed.

Figure 10A:
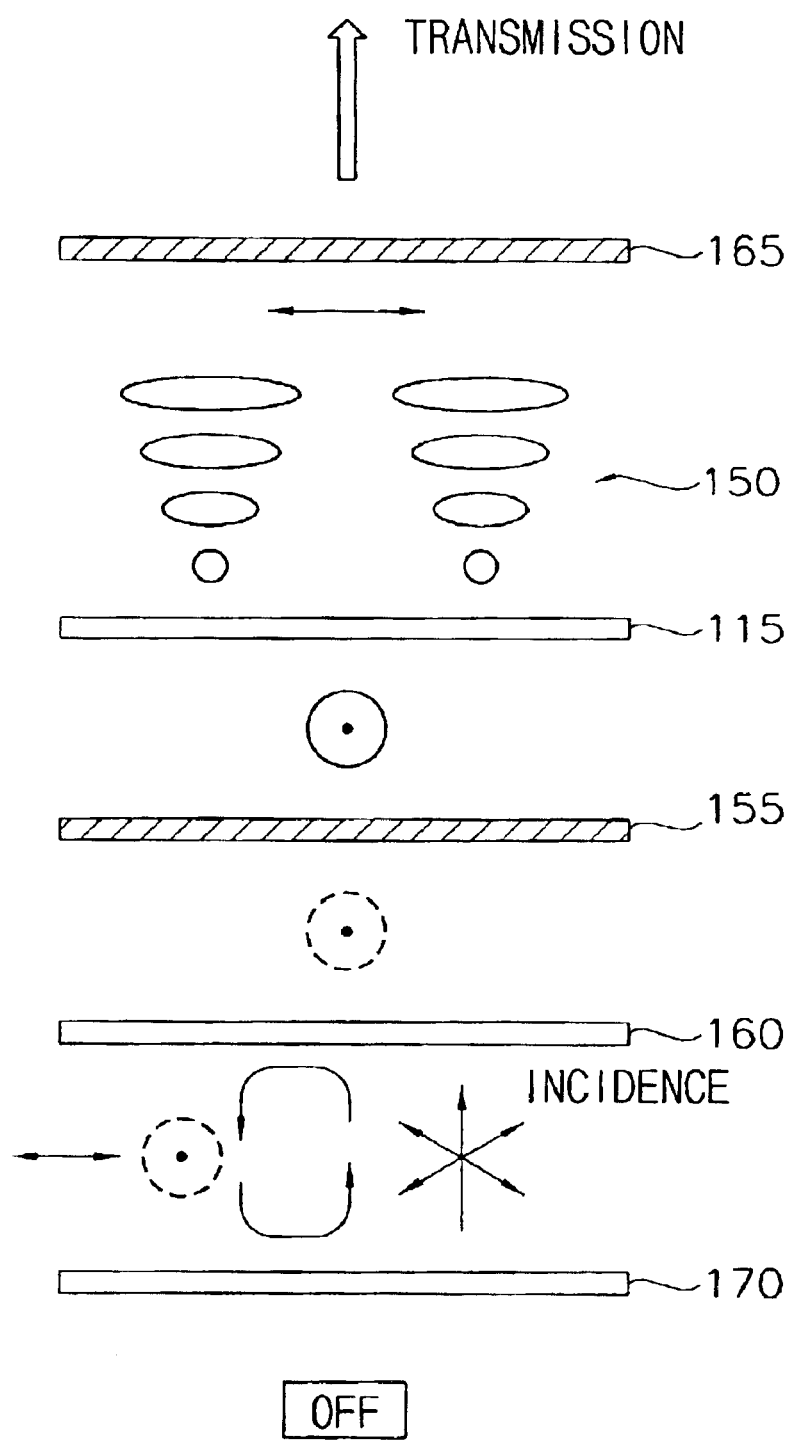
FIGS. 10A and 10B are schematic views for illustrating the transmissive and reflective type LCD of FIG. 4 applied in a transmission mode.

When a pixel voltage is not applied (OFF) in the transmission mode, as shown in FIG. 10A, light that is irradiated from the backlight 170 is incident onto the transflective film 160, so that the light is partially transmitted and reflected. In case that the transflective film 160 has the refractive characteristic of the relationship (1), polarization components, which is polarized in the x-direction parallel to the elongated direction of the transflective film 160 in the lights that have been incident onto the transflective film 160 is partially transmitted and reflected, whereas polarization components, which is polarized in the y-direction perpendicular to the elongated direction, are mostly reflected. Also, in case that the transflective film 160 has the refractive characteristic of the relationship (2), polarization components, which is polarized in the x- and y-directions, in the lights that have been incident onto the transflective film 160 are partially transmitted and reflected.

Thus, the light that has been transmitted through the transflective film 160 and the first polarizing plate 155 is linearly polarized in a direction parallel to the polarizing axis of the first polarizing plate 155. Afterwards, the linearly polarized light is transmitted through the first transparent electrode 115 and the liquid crystal 150, so that it is linearly polarized in a direction parallel to the polarizing axis of the second polarizing plate 165. Accordingly, the light linearly polarized in the direction parallel to the polarizing axis of the second polarizing plate 165 is transmitted through the second polarizing plate 165, so that a white image is displayed.

Also, light reflected by the transflective film 160 is restored between the backlight 170 and the transflective film 160, and then repeats to carry out the above steps. Thus, polarization components polarized parallel to the x-direction or polarization components polarized parallel to the x- and y-directions continuously is transmitted through the transflective film 160 and are used, so that light loss is eliminated and transmissivity and light efficiency are enhanced.

Figure 10B:
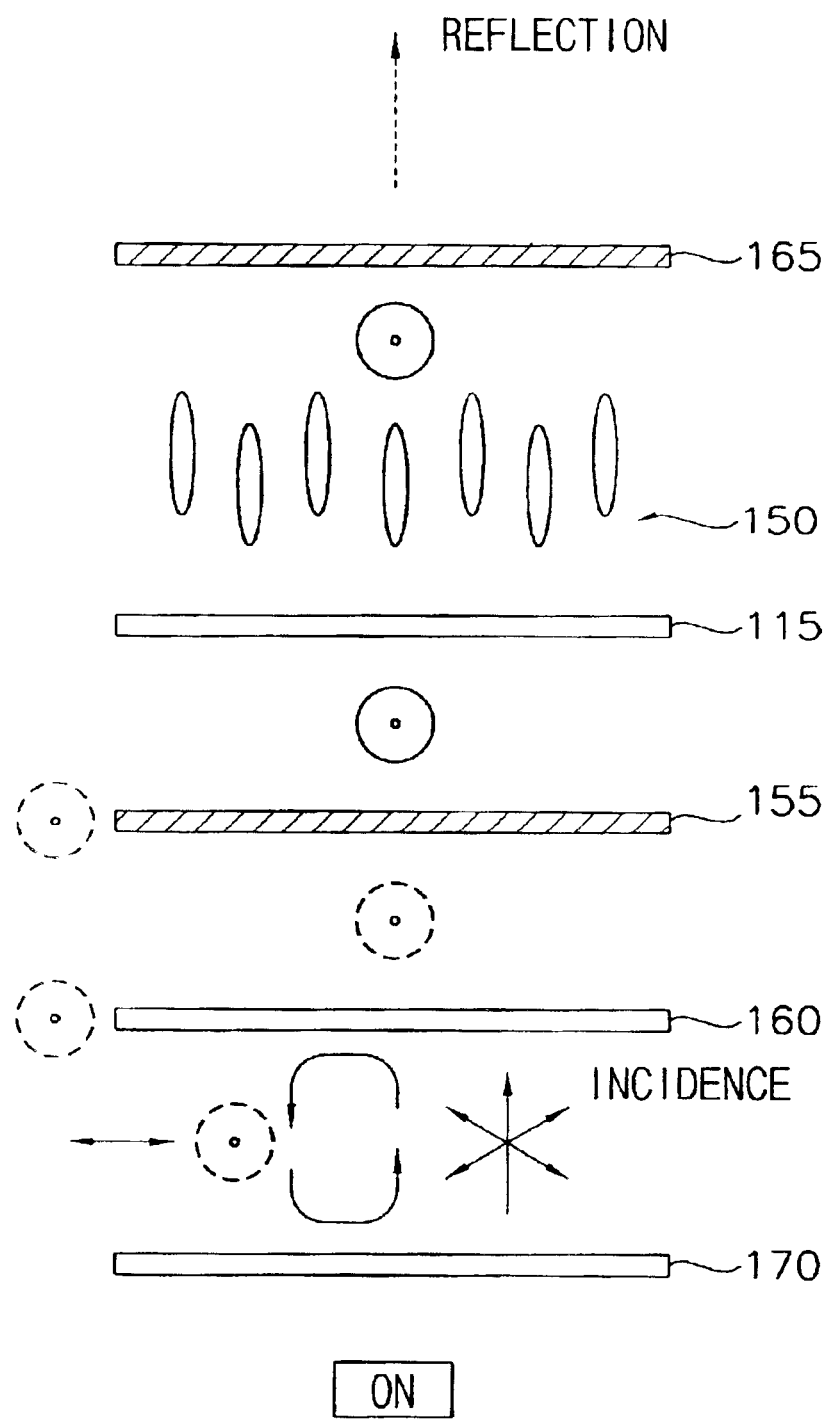

When a maximum pixel voltage is applied (ON) in the transmission mode, as shown in FIG. 10B, light that is irradiated from the backlight 170 is incident onto the transflective film 160, so that the incident light is partially transmitted through the transflective film 160 and is partially reflected by the transflective film 160. The light that has been transmitted through the transflective film 160 is transmitted through the first polarizing plate 155, so that it is converted onto light lineally polarized parallel to the polarizing axis of the first polarizing plate 155, i.e., a direction perpendicular to the polarizing axis of the second polarizing plate 165. Afterwards, the linearly polarized light is transmitted through the first transparent electrode 115 and the liquid crystal layer 150 without a variation in the polarizing state. Accordingly, the light linearly polarized in the direction perpendicular to the polarizing axis of the second polarizing plate 165 cannot be transmitted through the second polarizing plate 165, so that a black image is displayed.

Figure 11:
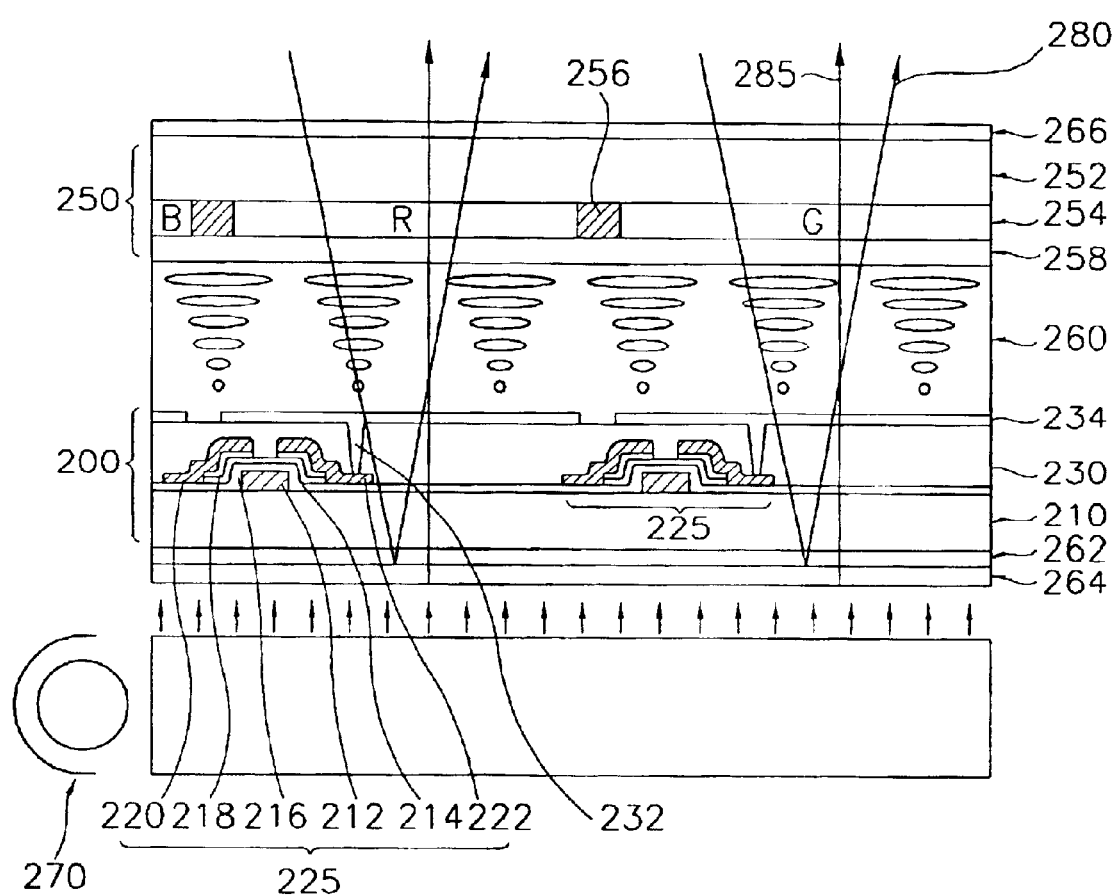
FIG. 11 is a sectional view of a transmissive and reflective type LCD in accordance with another embodiment of the present invention.

FIG. 11 is a sectional view of a transmissive and reflective type LCD in accordance with another embodiment of the present invention.

Referring to FIG. 11, a transmissive and reflective type LCD includes a first substrate 200, a second substrate 250 arranged facing the first substrate 200, a liquid crystal layer 260 formed between the First substrate 200 and the second substrate 250, and a backlight 270 arranged at a rear side of the first substrate 200.

The first substrate 200 includes a first insulating substrate 210. A plurality of gate lines (not shown) and a plurality of data lines (not shown) are formed on the first insulating substrate 210 in a matrix configuration. A pixel electrode 234 and a thin film transistor 225 are formed at a region defined by a pair of gate line and a pair of data lines. The second substrate 250 includes a second insulating substrate 252, a color filter 254 of RGB pixels, for displaying colors while light is transmitted therethrough, a black matrix 256 for preventing light from being leaked between pixels, and a transparent common electrode 258.

A thin film transistor 225 includes a gate electrode 212 formed on the first insulating substrate 210, a gate insulating film 214 formed on the gate electrode 212 and the first insulating substrate 210, an active pattern 216 and an ohmic contact pattern 218 both formed on the gate insulating film 214 on the gate electrode 212, and source and drain electrodes 220 and 222 formed apart from each other on the ohmic contact pattern 218. A passivation film 230 made of organic or inorganic substance is formed on the first insulating substrate 210 including the thin film transistor 225. A contact hole 232 penetrating the passivation film 230 is formed in the passivation film 230 to expose the drain electrode 222. The pixel electrode 234 is made of transparent conductive oxide such as ITO (Indium tin oxide).

The liquid crystal layer 260 is made of 90° twisted nematic (TN) liquid crystal, and has a $\Delta nd$ of about $0.2\,\mu m$ to about $0.6\,\mu m$ that is a product of a refractive anisotropy $\Delta n$ and a thickness d of the liquid crystal layer 260, preferably about $0.48\,\mu m$. Thus, the value on the refractivity anisotropy allows the LCD of the present invention to use the LC optical condition of the conventional transmission type LCD without any modification, thereby preventing the reliability of the liquid crystal from being lowered.

Depending on alignment direction of the liquid crystal layer 260, first and second polarizing plates 262 and 266 for transmitting only light propagating in a specific direction are respectively attached on outer surfaces of the first and second substrates 210 and 252. Preferably, the first and second polarizing plates 262 and 266 are linear polarizers of which polarizing axes are arranged perpendicular to each other.

The gate electrode 212 of the thin film transistor 225 is connected to the gate line, the source electrode 220 is connected to the data line, and the drain electrode 222 is connected to the pixel electrode 234 through the contact hole 232. Accordingly, as a scanning voltage is applied to the gate electrode 212, a signal voltage flowing through the data line is applied to the drain electrode 222 through the active pattern 216 from the source electrode 220. If the signal voltage is applied to the drain electrode 222, there is generated a voltage difference between the pixel electrode 234 connected to the drain electrode 222 and the common electrode 258 of the second substrate 252. As a consequence, molecular arrangement of the liquid crystal layer 260 injected between the pixel electrode 234 and the common electrode 258 varies, and thereby light transmissivity through the liquid crystal layer 260 varies. Thus, the thin film transistor 225 performs the role as switching element for turning on or turning off pixels of the LC cell.

According to an embodiment of the present invention, a transflective film 264 is formed between the first polarizing plate 262 and the backlight 270. The transflective film 264 is formed of a plurality of transparent layers in which first and second layers (not shown) having different refractivity are alternatively stacked. As described in the above embodiment, the transflective film 264 functions to partially transmit and reflect the incident light. In other words, the transflective film 264 can be formed in a structure having anisotropy characteristic in which degrees of the transmissivity and the reflectivity vary with polarizing state and direction of the incident light, or in a structure having isotropy characteristic in which degrees of the transmissivity and the reflectivity do not vary with polarizing state and direction of the incident light. In any cases, it is desirable that the transflective film 264 is formed to have about 4% or more in the reflectivity with respect to polarization components in all directions. The transflective film 264 is formed in an integrally formed structure with the first polarizing plate 262 or in a structure separated from the first polarizing plate 262.

Further, to prevent specular reflection and properly diffuse reflected lights in several directions, the transmissive and reflective type LCD in accordance with the present embodiment can further include a light scattering layer (not shown) on either the first substrate 200 or the second substrate 250. For instance, the light scattering layer can be formed between the first substrate 200 and the first polarizing plate 262, between the second substrate 250 and the second polarizing plate 266, or between the first polarizing plate 262 and the transflective film 264. The light scattering layer is formed in an integrally formed structure with the first polarizing plate 262 or the second polarizing plate 266, or in a structure separated from the first polarizing plate 262 or the second polarizing plate 266. Also, the light scattering layer can be made by mixing adhesive and beads.

Moreover, to optimize light efficiency in the transmissive and reflective type LCD of the present embodiment, a phase differential plate (not shown) can be further formed on either the first substrate 200 or the second substrate 250. For instance, the phase differential plate is formed between the first substrate 200 and the first polarizing plate 262 or between the second substrate 250 and the second polarizing plate 266. Also, the phase difference plate is formed in an integrally formed structure with the first polarizing plate 262 or the second polarizing plate 266, or in a structure separated from the first polarizing plate 262 or the second polarizing plate 266.

According to the transmissive and reflective type LCD of the present embodiment, a reflection electrode is not formed within the LC cell, but the transflective film 264 substitutes for the reflection electrode, and performs the role of the reflection electrode. Accordingly, light that is incident toward the second substrate 252 from an outside has a reflection light path 280 in which the light is transmitted through the first substrate 210, is reflected by the transflective film 264, and is output through the second substrate 252. Also, light that is incident toward the first substrate 200 from the backlight 270 has a transmission light path 285 in which the light is transmitted through the transflective film 264 and then is output through the second substrate 250.

Figure 1:
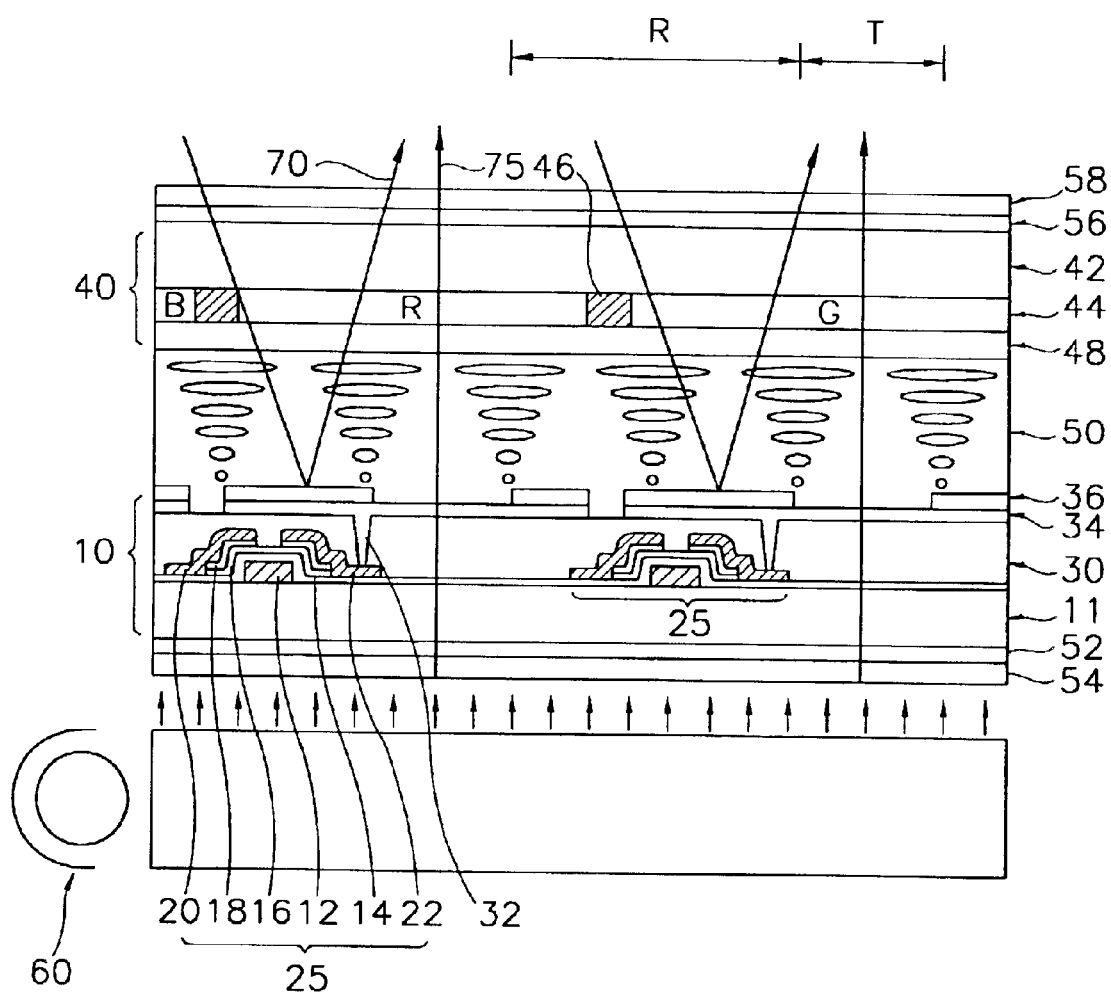
FIG. 1 is a sectional view of a conventional transmissive and reflective type LCD.
Figure 2A:
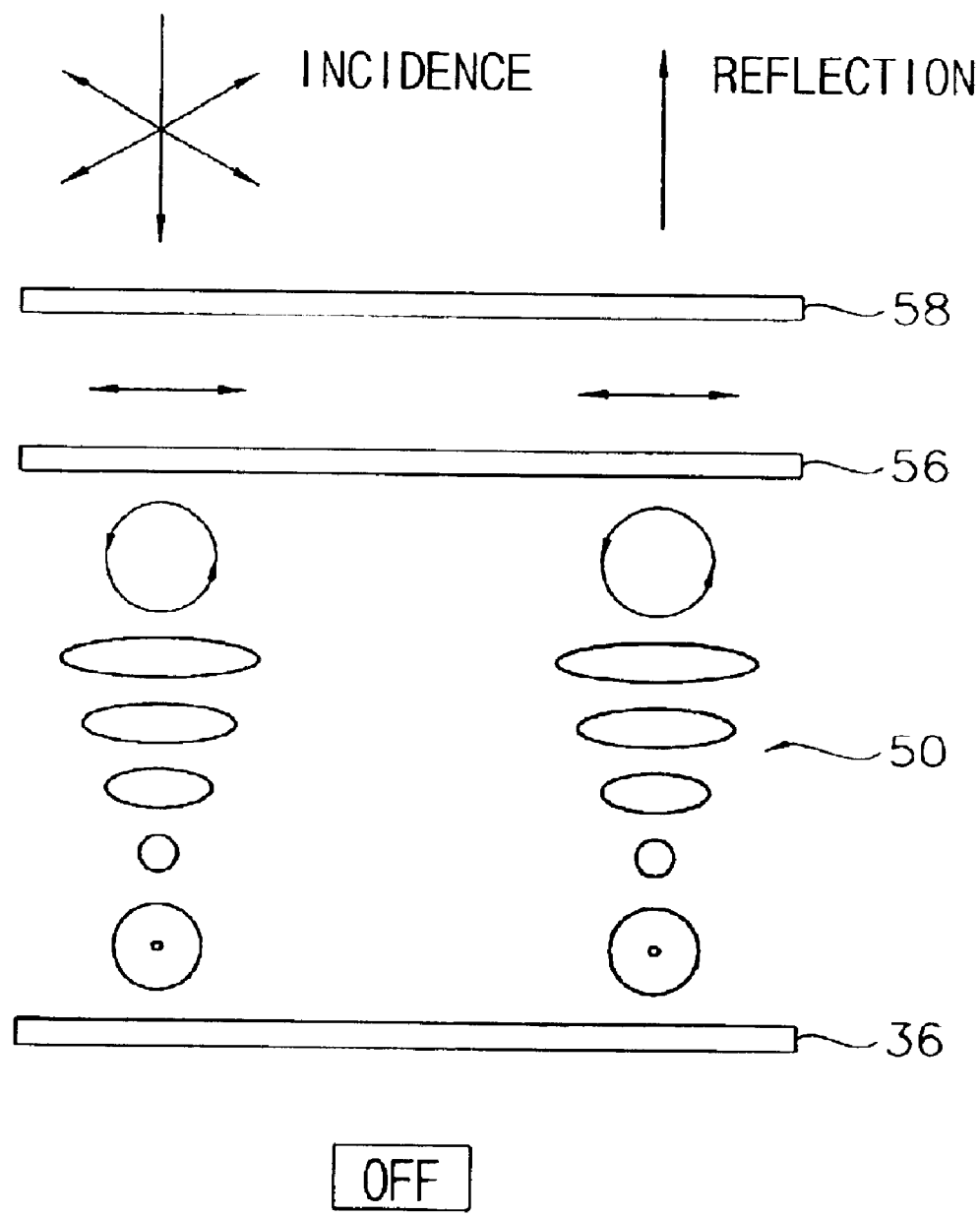
FIGS. 2A and 2B are schematic views for illustrating a conventional transmissive and reflective type LCD of FIG. 1 in a reflection mode.
Figure 2B:
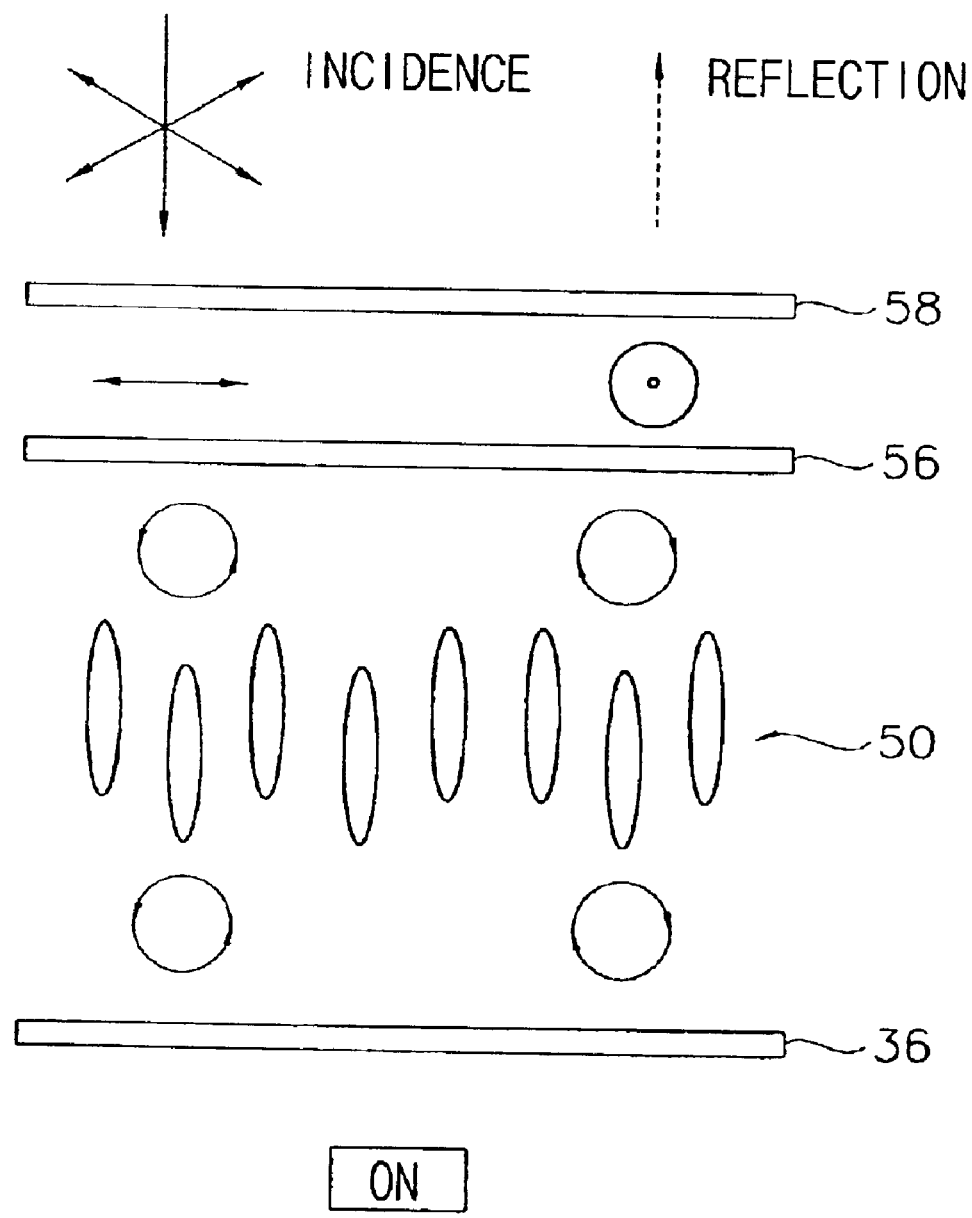
Figure 3A:
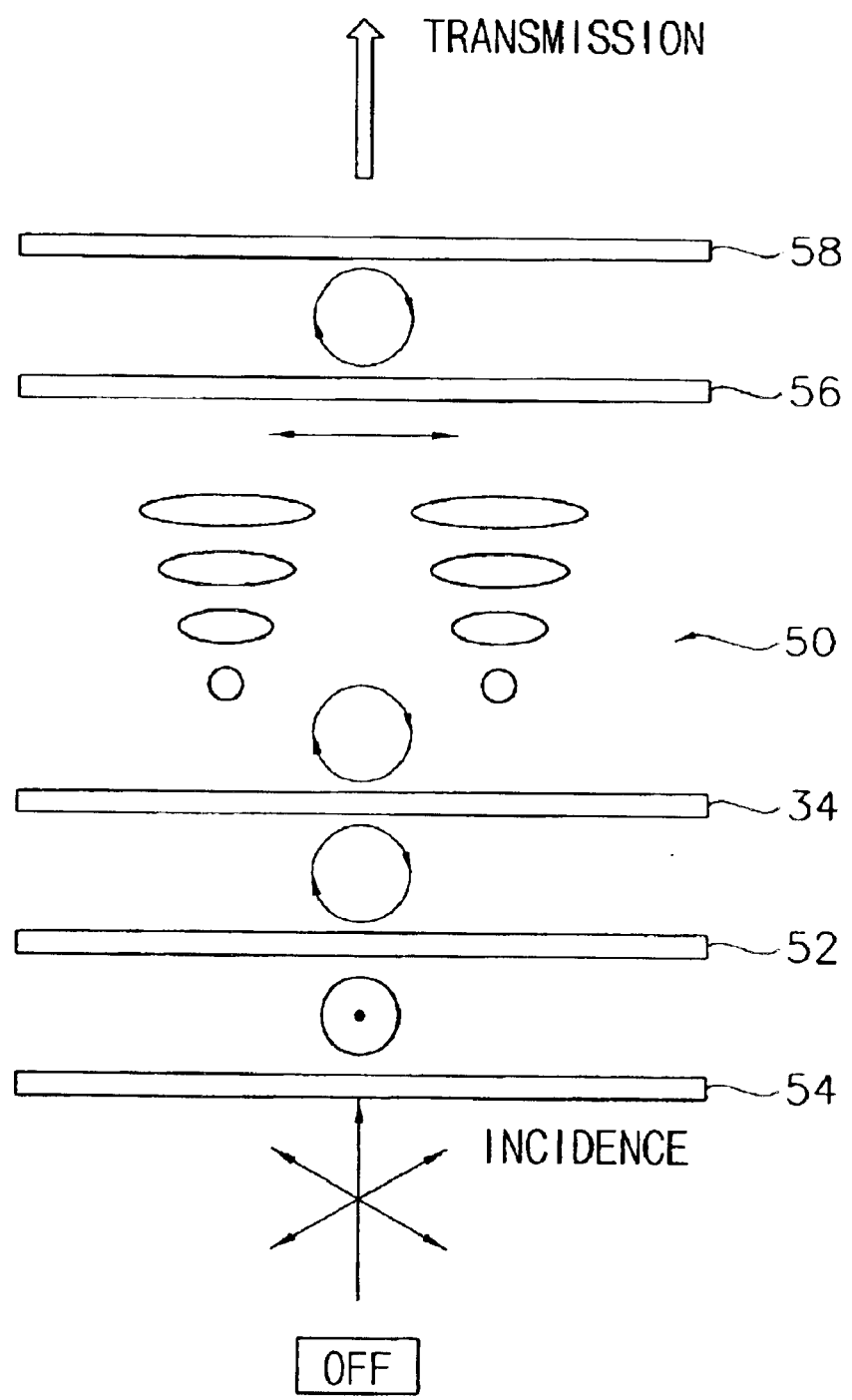

The transmissive and reflective type LCD shown in FIG. 11 has the same operation mechanism in the reflection mode and the transmission mode as those described with reference to FIG. 7A through FIG. 10B. In other words, by using the transflective film 264 which partially transmits and reflects the incident light, light loss is not generated in the reflection mode and the transmission mode, so that it is possible to enhance both of the reflectivity and transmissivity. Also, compared with the conventional transmissive and reflective type LCD of FIG. 1, the transmissive and reflective type LCD of the present invention does not require a ¼-wavelength phase difference plate on the lower substrate, i.e., the first substrate 210. Further, light that is incident from the backlight 270 and is reflected from regions where a metal layer, such as the gate line or data line, exists within the LC cell, are restored between the transflective film 264 and the backlight 270 and the restored lights are used, so that it increases overall light efficiency.

As described above, according to a preferred embodiment of the present invention, between the first polarizing plate attached on the outer surface of the lower substrate (i.e., first substrate) and the backlight is formed an anisotropy transflective film having an optical characteristic in which light components in a specific direction are strongly reflected and polarization components in a direction perpendicular to the specific direction are partially transmitted and reflected depending on polarizing state and direction of an incident light, or an isotropy transflective film having an optical characteristic in which light components are partially transmitted and reflected regardless of polarizing state and direction of the incident light. As a result, by a restoring process of light occurring between the transflective film and the backlight, the restored light is transmitted through the transflective film repeatedly, so that transmissivity and light efficiency are enhanced.

Further, the transmissive and reflective type LCD according to a preferred embodiment of the present invention does not require a reflection electrode within LC cell or a ¼-wavelength phase difference plate on each of the upper substrate (second substrate) and the lower substrate (first substrate). Accordingly, compared with the conventional transmissive and reflective type LCD, the transmissive and reflective type LCD of the present invention is simpler and can be more easily made.

Furthermore, since the optical conditions applied to the liquid crystal of the conventional transmissive and reflective type LCD can be identically applied to that of the transmissive and reflective type LCD of the present invention, there is no degradation in reliability.

While the present invention has been described in detail, it should be understood that various changes, substitutions and alterations can be made hereto without departing from the spirit and scope of the invention as defined by the appended claims.

What is claimed is:

1. A transmissive and reflective type LCD comprising:
   a first substrate;
   a second substrate having an inner surface facing the first substrate;
   a liquid crystal layer formed between the first substrate and the second substrate;
   a first polarizing plate formed on an outer surface of the first substrate;
   a second polarizing plate formed on an outer surface of the second substrate;
   a backlight for irradiating incident light onto the first polarizing plate; and
   a transflective film arranged between the first polarizing plate and the backlight, the transflective film reflecting a first polarization component of the incident light polarized in a first direction, and partially reflecting and transmitting a second polarization component of the incident light polarized in a second direction orthogonal to the first direction.

2. The transmissive and reflective type LCD of claim 1, wherein the transflective film includes at least a first layer and a second layer, the first and second layers having different refractivity indexes from each other and are alternatively stacked.

3. The transmissive and reflective type LCD of claim 1, wherein the transflective film is integrally formed with the first polarizing plate.

4. The transmissive and reflective type LCD of claim 1, wherein the transflective film is separately formed from the first polarizing plate.

5. The transmssive and reflective type LCD of claim 1, wherein the transflective film includes at least a first layer and a second layer, and the first layer of the transflective film has a refractive anisotropy and the second layer of the transflective film does not have the refractive anisotropy within a plane thereof.

6. The transmissive and reflective type LCD of claim 1, wherein the transflective film has anisotropy characteristics with transmissivity and reflectivity depending on polarizing state and direction of the incident light.

7. The transmissive and reflective type LCD of claim 6, wherein the transflective film includes at least a first layer and a second layer, and each of the first layer and the second layer has three main refractive indexes of $n_x$, $n_y$, and $n_z$ with the following relationships:

$$n1_x = n1_z \ne n1_y;$$

$$n2_x = n2_y = n2_z;$$

$$n1_x \ne n2_x;$$

$$n1_y \ne n2_y;$$

and $$|n1_x - n2_x| < |n1_y - n2_y|,$$

wherein the transflective film has a thickness direction of z-axis and a film plane of x-y plane, wherein n1x, n1y, and n1z denotes a main refractive index of the first layer in an x-axis, y-axis, and z-axis, respectively, and n2x, n2y, and n2z denotes a main refractive index of the second layer in an x-axis, y-axis, and z-axis, respectively.

8. The transmissive and reflective type LCD of claim 1, wherein the transflective film comprises at least two transflective films having a varying transmissivity and reflectivity depending on polarizing state and direction of the incident light, the two transflective films being disposed one on top of the other.

9. The transmissive and reflective type LCD of claim 1, wherein the transflective film comprises a first transflective film and a second transflective film vertically aligned with each other, the first transflective film having a transmissivity and a reflectivity that vary according to polarizing state and direction of the incident light, and the second transflective film having isotropic transmission and reflection characteristics independent of the polarizing state and the direction of the incident light.

10. The transmissive and reflective type LCD of claim 1, wherein the transflective film has a reflectivity of no less than about 4% with respect to any direction of polarization components when the incident light is incident onto the transflective film with an angle perpendicular to a surface thereof.

11. The transmissive and reflective type LCD of claim 1, further comprising a light scattering layer formed on the first substrate or the second substrate.

12. The transmissive and reflective type LCD of claim 11, wherein the light scattering layer is formed between the first substrate and the first polarizing plate, between the second substrate and the second polarizing plate, or between the first polarizing plate and the transflective film.

13. The transmissive and reflective type LCD of claim 1, further comprising a phase difference plate formed on the first substrate or the second substrate.

14. The transmissive and reflective type LCD of claim 13, wherein the phase difference plate is formed between the first substrate and the first polarizing plate, or between the second substrate and the second polarizing plate.

15. The transmissive and reflective type LCD of claim 1, wherein the liquid crystal layer has a $\Delta nd$ of about 0.2 $\mu$m to about 0.6 $\mu$m that is a product of a refractive anisotropy $\Delta n$ and a thickness d of the liquid crystal layer.

16. The transmissive and reflective type LCD of claim 1, wherein a transmitting direction of the incident light at the first polarizing plate is the same direction as a partially reflecting and transmitting direction of the incident light at the transflective film.

17. A transmissive and reflective type LCD for partially reflecting and transmitting incident light, comprising:
   an LC cell including a first substrate, a second substrate having an inner surface that is arranged to face the first substrate, and a liquid crystal layer formed between the first substrate and the second substrate;
   a first polarizing plate formed on an outer surface of the first substrate;
   a second polarizing plate formed on an outer surface of the second substrate;
   a backlight arranged at a rear side of the first polarizing plate; and
   a transparent transflective film arranged between the first polarizing plate and the backlight and having a plurality of layers in which a first layer and a second layer have different refractivity indexes from each other, the transflective film reflecting a first polarization component of the incident light polarized in a first direction, and partially reflecting and transmitting a second polarization component of the incident light polarized in a second direction orthogonal to the first direction, wherein the transmissive and reflective type LCD has a reflection light path along which the incident light is incident onto the LC cell from a front side of the LC cell, is reflected by the transflective film, and is output through the front side of the LC cell, and a transmission light path along which the incident light is incident onto the LC cell from a rear side of the LC cell, is transmitted through the transflective film, and is output through the front side of the LC cell.

18. The transmissive and reflective type LCD of claim 17, wherein the first layer of the transflective film has refractive anisotropy and the second layer of the transflective film does not have refractive anisotropy.

19. The transmissive and reflective type LCD of claim 17, wherein the transflective film has anisotropy characteristics of varying transmissivity and reflectivity depending on polarizing state and direction of the incident light.

20. The transmissive and reflective type LCD of claim 19, wherein each of the first layer and the second layer has three main refractive indexes of $n_x$, $n_y$, and $n_z$ with the following relationships:

$$n1_x=n1_z \neq n1_y;$$

$$n2_x=n2_y=n2_z;$$

$$n1_x \neq n2_x;$$

$$n1_y \neq n2_y;$$

and $$|n1_x-n2_x|<|n1_y-n2_y|,$$

wherein the transflective film has a thickness direction of z-axis and a film plane of x-y plane, wherein n1x, n1y, and n1z denotes a main refractive index of the first layer in an x-axis, y-axis, and z-axis, respectively, and n2x, n2y, and n2z denotes a main refractive index of the second layer in an x-axis, y-axis, and z-axis, respectively.

21. The transmissive and reflective type LCD of claim 17, wherein the transflective film comprises two transflective films having a varying transmissivity and reflectivity depending on polarizing state and direction of incident light, the two transflective films being vertically aligned with each other.

22. The transmissive and reflective type LCD of claim 17, wherein the transflective film comprises a first transflective film and a second transflective film disposed to each other, the first transflective film having a transmissivity and a reflectivity that varies dependently upon polarizing state and direction of incident light, and the second transflective film having isotropic transmission and reflection characteristics independent of polarizing state and direction of incident light.

23. The transmissive and reflective type LCD of claim 17, when the incident light is incident onto the transflective film with an angle perpendicular to a plane thereof, wherein the transflective film has a reflectivity of no less than about 4% with respect to all directions of polarization components.

24. The transmissive and reflective type LCD of claim 17, further comprising a light scattering layer formed on the first substrate or the second substrate.

25. The transmissive and reflective type LCD of claim 17, wherein a transmitting direction of the incident light at the first polarizing plate is the same direction as a partially reflecting the transmitting direction of the incident light at the transflective film.

26. A transmissive and reflective type LCD comprising:
a first substrate on which a first transparent electrode is formed;
a second substrate of which an inner surface is arranged facing the first substrate, the inner surface of the second substrate having a second transparent electrode thereon;
a liquid crystal layer formed between the first substrate and the second substrate;
a first polarizing plate formed on an outer surface of the first substrate;
a second polarizing plate formed on an outer surface of the second substrate, opposite the inner surface of the second substrate;
a backlight arranged at a rear side of the first polarizing plate; and
a transparent transflective film arranged between the first polarizing plate and the backlight, the transflective film reflecting a first polarization component of incident light polarized in a first direction, and partially reflecting and transmitting a second polarization of the incident light polarized in a second direction orthogonal to the first direction.

27. The transmissive and reflective type LCD of claim 26, wherein the transparent transflective film includes at least a first layer and a second layer, the first and second layers having different refractivity indexes from each other and being alternatively stacked.

28. The transmissive and reflective type LCD of claim 26, wherein the first transparent electrode is a signal electrode and the second transparent electrode is a scanning electrode.

29. The transmissive and reflective type LCD of claim 26, wherein a transmitting direction of the incident light at the first polarizing plate is the same direction as a partially reflecting and transmitting direction of the incident light at the transflective film.

30. A transmissive and reflective type LCD comprising:
a first substrate on which a switching element and a transparent pixel electrode connected to the switching element are formed;
a second substrate of which an inner surface is arranged facing the first substrate, the inner surface of the second substrate having a transparent common electrode thereon;
a liquid crystal layer formed between the first substrate and the second substrate;
a first polarizing plate formed on an outer surface of the first substrate;
a second polarizing plate formed on an outer surface of the second substrate, opposite the inner surface of the second substrate;
a backlight arranged at a rear side of the first polarizing plate; and
a transparent transflective film arranged between the first polarizing plate and the backlight, said transparent transflective film having a plurality of layers in which a first layer and a second layer having different refractivity indexes from each other are alternatively stacked, the transparent transflective film reflecting a first polarization component of incident light polarized in a first direction, and partially reflecting and transmitting a second polarization component of the incident light polarized in a second direction orthogonal to the first direction.

31. The transmissive and reflective type LCD of claim 30, wherein the switching element is a thin film transistor.

32. The transmissive and reflective type LCD of claim 30, wherein a transmitting direction of the incident light at the first polarizing plate is the same direction as a partially reflecting and transmitting direction of the incident light at the transflective film.

* * * * *